(12) United States Patent
DiCarlo

(10) Patent No.: US 11,898,860 B2
(45) Date of Patent: Feb. 13, 2024

(54) SYSTEMS AND METHODS FOR ROUTING DECISIONS BASED ON DOOR USAGE DATA

(71) Applicant: Lyft, Inc., San Francisco, CA (US)

(72) Inventor: Michael Jonathan DiCarlo, El Dorado Hills, CA (US)

(73) Assignee: Lyft, Inc., San Franciso (CA)

( * ) Notice: Subject to any disclaimer, the term of this patent is extended or adjusted under 35 U.S.C. 154(b) by 0 days.

(21) Appl. No.: 18/180,004

(22) Filed: Mar. 7, 2023

(65) Prior Publication Data

US 2023/0288215 A1 Sep. 14, 2023

Related U.S. Application Data

(63) Continuation of application No. 16/457,796, filed on Jun. 28, 2019, now Pat. No. 11,635,298.

(51) Int. Cl.
*G01C 21/34* (2006.01)
*G08G 1/00* (2006.01)
*G07C 5/08* (2006.01)
*G01C 21/36* (2006.01)

(52) U.S. Cl.
CPC ..... *G01C 21/3453* (2013.01); *G01C 21/3446* (2013.01); *G01C 21/3697* (2013.01); *G07C 5/0841* (2013.01); *G08G 1/202* (2013.01)

(58) Field of Classification Search
CPC ............ G01C 21/3453; G01C 21/3446; G01C 21/3697; G07C 5/0841; G08G 1/202
See application file for complete search history.

(56) References Cited

U.S. PATENT DOCUMENTS

| 2017/0030118 | A1* | 2/2017 | Elie ......................... E05B 81/66 |
| 2018/0217597 | A1* | 8/2018 | Greenberger .......... G06Q 50/10 |
| 2019/0204825 | A1* | 7/2019 | Golgiri ................ G05D 1/0055 |
| 2020/0167696 | A1* | 5/2020 | Kuncl ................... G07C 5/0841 |
| 2020/0249042 | A1* | 8/2020 | Warr ...................... H04W 4/023 |

* cited by examiner

*Primary Examiner* — Hunter B Lonsberry
*Assistant Examiner* — Jay Khandpur
(74) *Attorney, Agent, or Firm* — Greenberg Traurig, LLP

(57) ABSTRACT

The disclosed computer-implemented method may include identifying a transportation task within a dynamic transportation network, accessing a database of door closing event locations, wherein the database is populated from observed door closing events within the dynamic transportation network, determining location information specifying at least one of a pickup location and a drop-off location for the transportation task based at least in part on the database of door closing event locations, and providing the location information to a transportation provider computing device, wherein a transportation provider performs the transportation task that comprises at least one of picking up a transportation requestor at the pickup location and dropping off the transportation requestor at the drop-off location. Other methods, systems, and computer-readable media are disclosed.

20 Claims, 12 Drawing Sheets

SYSTEMS AND METHODS FOR ROUTING DECISIONS BASED ON DOOR USAGE DATA

CROSS REFERENCE TO RELATED APPLICATION

This application is a continuation of Ser. No. 16/457,796, filed Jun. 28, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
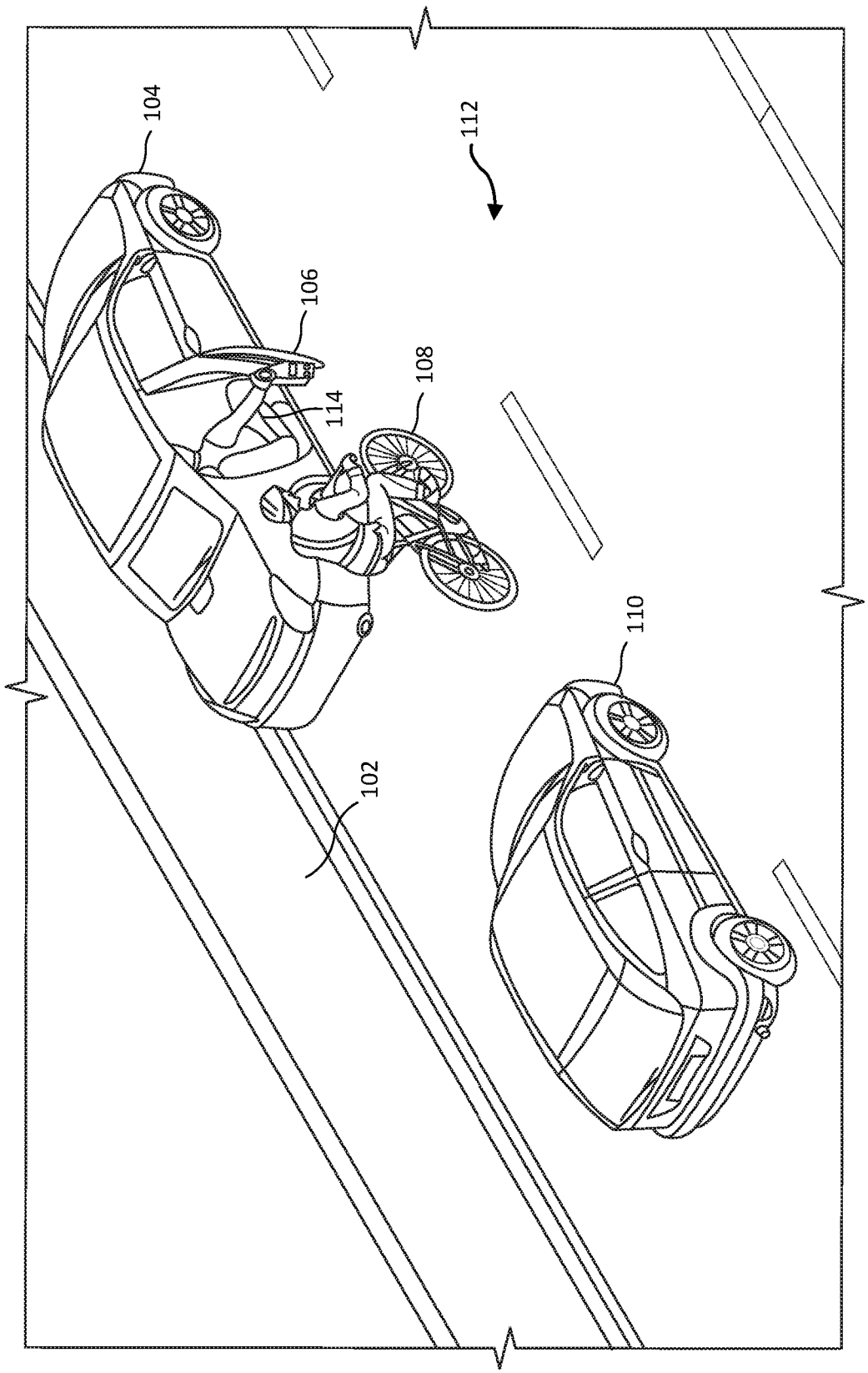
FIG. 1 is an illustration of a transportation requestor accessing a transportation provider vehicle.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to determining routing decisions based on vehicle door usage data. A dynamic transportation network that matches transportation requestors with transportation providers for transportation services may benefit from routing decisions based on vehicle door usage data. The routing decisions may increase the efficiency of the dynamic transportation network and increase transportation requestor satisfaction associated with transportation services. Further, the routing decisions may increase the convenience and quality of pickup and drop-off locations of transportation requestors. In some examples, the methods of the present disclosure may also increase the accuracy of recording the time and location of transportation requestor pickups and drop-offs thereby improving fraud detection by detecting when a transportation requestor has exited the transportation provider vehicle and the transportation provider has not indicated the transportation service has ended.

Door usage data may include data associated with door closing events on a transportation provider vehicle. Data associated with a door closing event may include the location of the vehicle at the time of the door closing, the day and time of the door closing, a number of passengers entering the vehicle through the door, etc. A dynamic transportation network may receive data associated with door closing events from multiple transportation provider devices over a network. The dynamic transportation network may store a historical record of the door closing events and provide routing decisions to a transportation provider device based on the record of the door closing events. The dynamic transportation network may provide the routing decisions to a transportation provider's device over a network. The dynamic transportation network may provide routing decisions a transportation provider's device including determining pickup and drop-off locations based on the location of a transportation requestor. A transportation requestor may request a pickup or drop-off location that is located on the side of a road. The dynamic transportation network may use map data and door closing event data to route the transportation provider to the pickup or drop-off location such that the transportation requestor may enter or exit the vehicle on the side with a higher convenience score (e.g., curbside). In some examples, the dynamic transportation network may use map data and door closing event data to route the transportation provider to a pickup or drop-off location with a high location score. A location score of the pickup or drop-off location may be based on any of a variety of factors. For example, the location score of the pickup or drop-off location may be based on the fitness, convenience, safety, entry time, exit time, and/or legality of the pickup or drop-off location.

A dynamic transportation network may determine a transportation provider location score based on historical data of transportation requestors entering or exiting the transportation provider's vehicle on the traffic side or curb side of the vehicle. Alternatively or additionally, a dynamic transportation network may match transportation requests to transportation providers based on the transportation provider location scores. For example, a dynamic transportation network may receive a transportation request for which there are multiple available transportation providers to fulfill the request. The dynamic transportation network may match the request with a transportation provider based on the location scores of the available providers (e.g., the dynamic transportation network may match the request with the available transportation provider having the highest location score).

Detecting a vehicle door closing may be accomplished using any suitable method. An example method may include receiving sensor data, processing the sensor data, and determining that the sensor data corresponds to a door closing event. The sensor data may be acquired by a computing device (e.g., smartphone) within a transportation provider's vehicle. The sensor data may be from an inertial measurement unit (e.g., a gyroscope and/or an accelerometer) that measures speed and acceleration in multiple linear and rotation directions. A processor may process the data using any suitable method. For example, a processor may use Fast Fourier Transform, time domain digital signal processing, linearization, filtering, finite impulse response, or a combination thereof to process the sensor data. The sensor data processing may produce an event signature associated with the door closing event. The processor may detect a door closing event associated with the vehicle based on the event signature. Additionally or alternatively, sensors other than inertial sensors may be used to determine the door closing event signature. For example, a computing device in the vehicle may include a barometric pressure sensor that measures a relative change in air pressure within the cabin of the vehicle caused by the closing of a door. As another example, a computing device in the vehicle may include a microphone that senses sound waves in the cabin of the vehicle. A door closing on a vehicle may cause an impact sound wave that may be detected by the signature of the sound wave. Other methods of detecting door closing events may include image processing, radar ranging, laser ranging, radio frequency identification, or a combination thereof.

As will be explained in greater detail below, determining routing decisions and providing the routing decisions to transportation providers based on recorded door usage data using the systems and methods disclosed herein may provide benefits to the operation of the dynamic transportation network. Accordingly, as may be appreciated, the systems and methods described herein may improve the functioning of a computer that implements transportation matching and routing. For example, these systems and methods may improve the functioning of the computer by improving transportation routing decisions. Additionally or alternatively, these systems and methods may improve the functioning of the computer by reducing the computing resources consumed to identify appropriate transportation routing decisions (and, e.g., thereby freeing computing resources for other tasks, such as those directly and/or indirectly involved in transportation matching).

Figure 2:
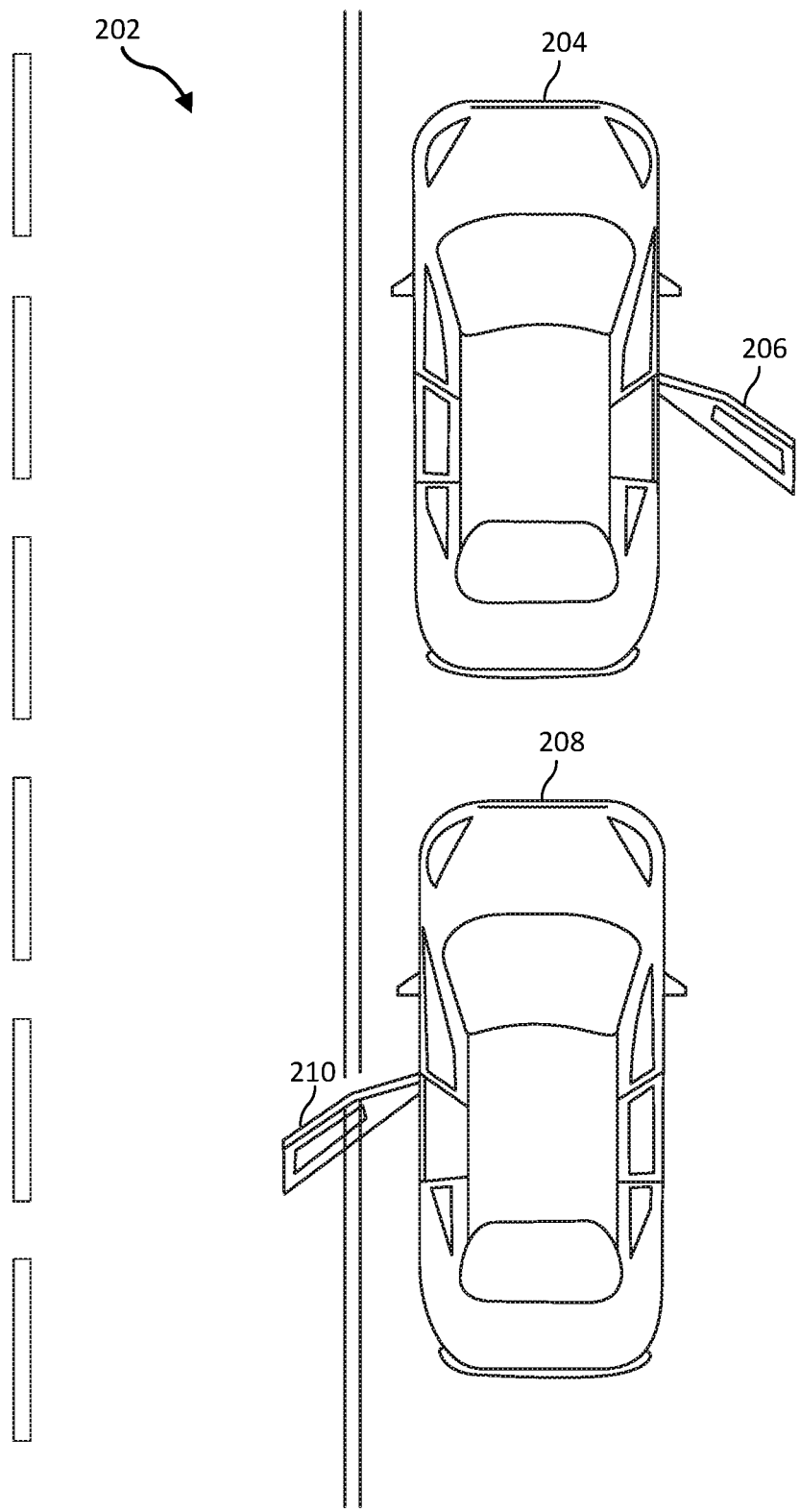
FIG. 2 is an illustration of door closing events occurring on stationary vehicles.

The following will provide, with reference to FIGS. 1 and 2, detailed descriptions of door closing events on stationary vehicles. Descriptions of FIG. 3 will provide details of pickup and drop-off locations based on door closing events. Descriptions of FIG. 4 will provide details of a map of a geographic area including pickup and drop-off locations based on door closing events. Descriptions of FIG. 5 will provide details of a dashboard mounted computing device that provides door usage guidance. Descriptions of FIG. 6 will provide details of a transportation requestor computing device that provides door usage guidance. Descriptions of FIGS. 7 and 8 will provide details of a block diagram and modules for detecting door closing events. FIG. 9 will provide details of a method for providing routing decisions to a transportation provider device based on a historical record of door closing events. Descriptions of FIGS. 10-12 will provide details of an example transportation requestor/transportation provider management environment.

FIG. 1 is an illustration of a transportation requestor accessing a transportation provider vehicle. A transportation requestor may access a transportation provider vehicle for transportation services in a dynamic transportation network. A transportation requestor may access the transportation provider vehicle in proximity to a road that includes vehicle traffic. A transportation provider may stop the transportation provider vehicle alongside the road in order to pick up or drop off a transportation requestor. For example, transportation provider vehicle 104 may stop alongside curb 102 on road 112 to pick up or drop off transportation requestor 114. Transportation requestor 114 may enter or exit vehicle 104 through door 106. Door 106 may open into traffic on road 112 thereby creating an obstacle to traffic including cyclist 108 and vehicle 110 and place transportation requestor 114 in the path of oncoming traffic. In some examples, transportation requestor 114 may enter or exit vehicle 104 through a left side vehicle door from curb 102 thereby preventing transportation requestor 114 and the left side vehicle door from obstructing traffic on road 112. When transportation requestor 114 closes a door on vehicle 104 sensors within the vehicle may detect the door closing event. In some examples, a dynamic transportation network may determine transportation provider routing decisions based at least in part on the door closing event and provide the routing decisions to a transportation provider.

In some examples, a dynamic transportation network may determine location scores associated with pick and drop-off locations based on the location of the door closing event relative to the location of a transportation provider vehicle. For example, map data may indicate that vehicle 104 is located on the left side of road 112 and door 106 is adjacent to oncoming traffic. A transportation requestor entering or exiting the right side of vehicle 104 may expose the transportation requestor to oncoming traffic and therefore the right side of vehicle 104 may have a lower location score than the left side of vehicle 104 based on the risk to the transportation provider. Pickup and drop-off locations on the left side of vehicle 104 when pulled over to the left side of a road (e.g., curb 102 side) may have a higher location score than the right side of vehicle 104. The dynamic transportation network may use map data and door closing event data to route vehicle 104 to the pickup or drop-off location such that the transportation requestor may enter or exit the vehicle on the side with a higher location score (e.g., curbside 102).

FIG. 2 is an illustration of door closing events on stationary vehicles. In some examples, a dynamic transportation network may make routing decisions based on data associated with door closing events on a vehicle that provides transportation services. For example, the dynamic transportation network may use data associated with which door(s) of a vehicle have closed, the location of the vehicle at the time of door closing, the day and time of the door closing, the number of passengers entering the vehicle through the door, etc., in order to determine routing decisions. Referring to FIG. 2, vehicle 204 may be a transportation provider vehicle operating in a dynamic transportation network. Vehicle 204 may provide transportation services and be stationary on the right side of road 202 during the process of picking up a transportation requestor or dropping off a transportation requestor. The transportation requestor may close right door 206 after entering or exiting the vehicle. A dynamic transportation network may use data associated with the right door 206 closing event in order to determine transportation provider routing decisions. Vehicle 208 may also provide transportation services and be stationary on the right side of road 202 during the process of picking up a transportation requestor or dropping off a transportation requestor. The transportation requestor may close left door 210 after entering or exiting the vehicle. A dynamic transportation network may use data associated with the left door 210 closing event in order to determine transportation provider routing decisions. Additionally or alternatively, data associated with door closings may be used to provide guidance to a transportation requestor as to which door the transportation requestor should enter or exit the vehicle. For example, data associated with door closings may be used to guide the transportation requestor to use right door 206 for entering or exiting the vehicle so that the transportation requestor may avoid any traffic traveling on road 202. Data associated with door closings may also be used to control locking mechanisms on the vehicle doors. For example, vehicle 204 may lock the left door of the vehicle and unlock right door 206 so that the transportation requestor may enter or exit right door 206 only and therefore avoid any traffic traveling on road 202.

Figure 3:
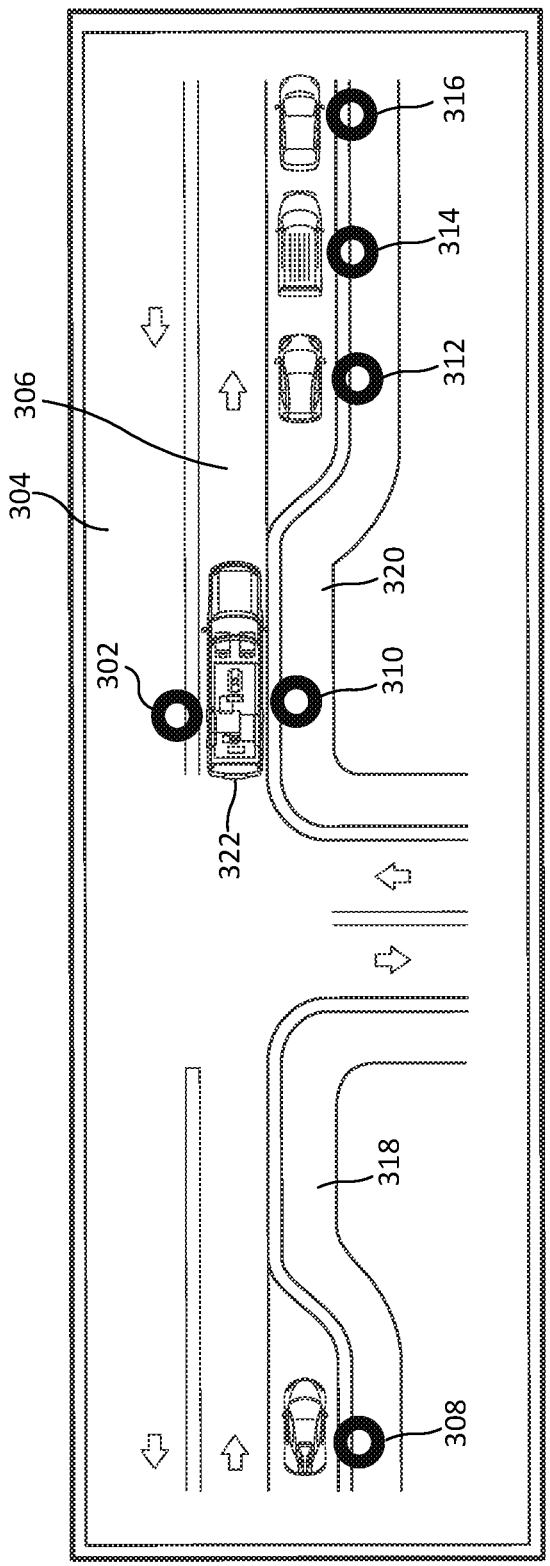
FIG. 3 is an illustration of pickup and drop-off locations associated with door closing events.

FIG. 3 is an illustration of pickup and drop-off locations associated with door closing events. As described above with respect to FIG. 1, a transportation provider may stop a vehicle alongside a road to pick up or drop off a transportation requestor. When a transportation requestor enters or exits a transportation provider vehicle a door closing event may be detected. When the door closing event is detected, a location of the vehicle and/or a time stamp indicating the time of door closing may be recorded. The location of the vehicle may be determined using methods including, without limitation, a Global Positioning System (e.g., GPS) in the transportation providers device, a GPS in the transportation requestors device, an average of the locations determined by the GPS in the transportation providers device and the GPS in the transportation requestors device, or a combination thereof. In some examples, a dynamic transportation network may store a historical record of door closing events, the location of the door closing events, and a time stamp associated with the door closing events. A dynamic transportation network may use the record associated with door closing events to provide routing decisions to a transportation provider device. The routing decisions may include pickup and drop-off locations (e.g., a programmed location) for transportation requesters to enter or exit a transportation provider vehicle. For example, locations 302, 308, 310, 312, 314, and 316 may be located alongside traffic lane 306. Locations 308, 312, 314, and 316 may be located adjacent to pedestrian walkways 318 and 320 from which transportation requestors may enter or exit transportation provider vehicles. Locations 302, 308, 310, 312, 314, and 316 may each have a location score associated with their respective location. For example, locations 308, 312, 314, and 316 may have a higher location score associated with their respective location than locations 302 and 310. Locations 302 and 310 may have a lower location score as transportation provider vehicle 322 may impede the flow of traffic in lane 306 when stopped to pick up or drop off a passenger. Further, location 302 may have a lower location score due to a transportation requester being placed in oncoming traffic when entering or exiting the left side of vehicle 322 at location 302. A dynamic transportation network may provide routing decisions to a transportation provider device (e.g., smartphone) to route transportation provider vehicles to pickup and drop-off locations based on the location scores of the locations. For example, a dynamic transportation network may provide routing decisions to transportation provider devices to route transportation provider vehicles to pickup and drop-off locations 308, 312, 314, and 316 rather than locations 302 and 310 based on the higher location scores of locations 308, 312, 314, and 316. In some examples, when a transportation provider is picking up/dropping off at a location that has recorded a threshold number of left door closing events, the dynamic transportation network may instruct the transportation provider to remind the transportation requestor to exit the vehicle through the correct door, to travel to a location where the transportation requestor may exit the correct door, ask the transportation requestor which side of the street they would prefer to exit, or a combination thereof. In some examples, when a transportation provider is picking up/dropping off at a location that has recorded a threshold number of left door closing events, the dynamic transportation network may instruct the transportation requestor to find a nearby location that is more convenient for pickup/drop-off.

The location scores of the pick and drop-off location may be based on, without limitation, a historical record of door closing events, the location of door closing events, a time stamp of door closing events detected by sensors and processors within the transportation provider vehicles, or a combination thereof. The detection of door closing events and recording the location and time associated with door closing events is described in detail below with respect to FIGS. 7 and 8.

The location scores of the pick and drop-off location may be based on the location of the door closing event relative to a location of a transportation provider vehicle. For example, map data may indicate that pickup and drop-off location 302 is located on the left side of vehicle 322 and is adjacent to oncoming traffic in lane 304. A transportation requestor entering or exiting the left side of vehicle 322 may expose the transportation requestor to oncoming traffic in lane 304, therefore pickup and drop-off location 302 may have a lower location score based on the risk to the transportation provider. Pickup and drop-off locations on the left side of a transportation provider vehicle that is pulled over to the right side of a road may have a lower location score than pickup and drop-off locations on the right side (e.g., curb side) of the road. Similarly, pickup and drop-off locations on the right side of a transportation provider vehicle that is pulled over to the left side of a road may have a lower location score than pickup and drop-off locations on the left side (e.g., curb side) of the road.

In some examples, a dynamic transportation network may provide routing decisions including determining pickup and drop-off locations based on the location of a transportation requestor. A transportation requestor may request a pickup or drop-off location that is located on the side of a road. The dynamic transportation network may use map data and door closing event data to route the transportation provider to the pickup or drop-off location such that the transportation requestor may enter or exit the vehicle on the vehicle side with a higher location score (e.g., curbside).

Figure 4:
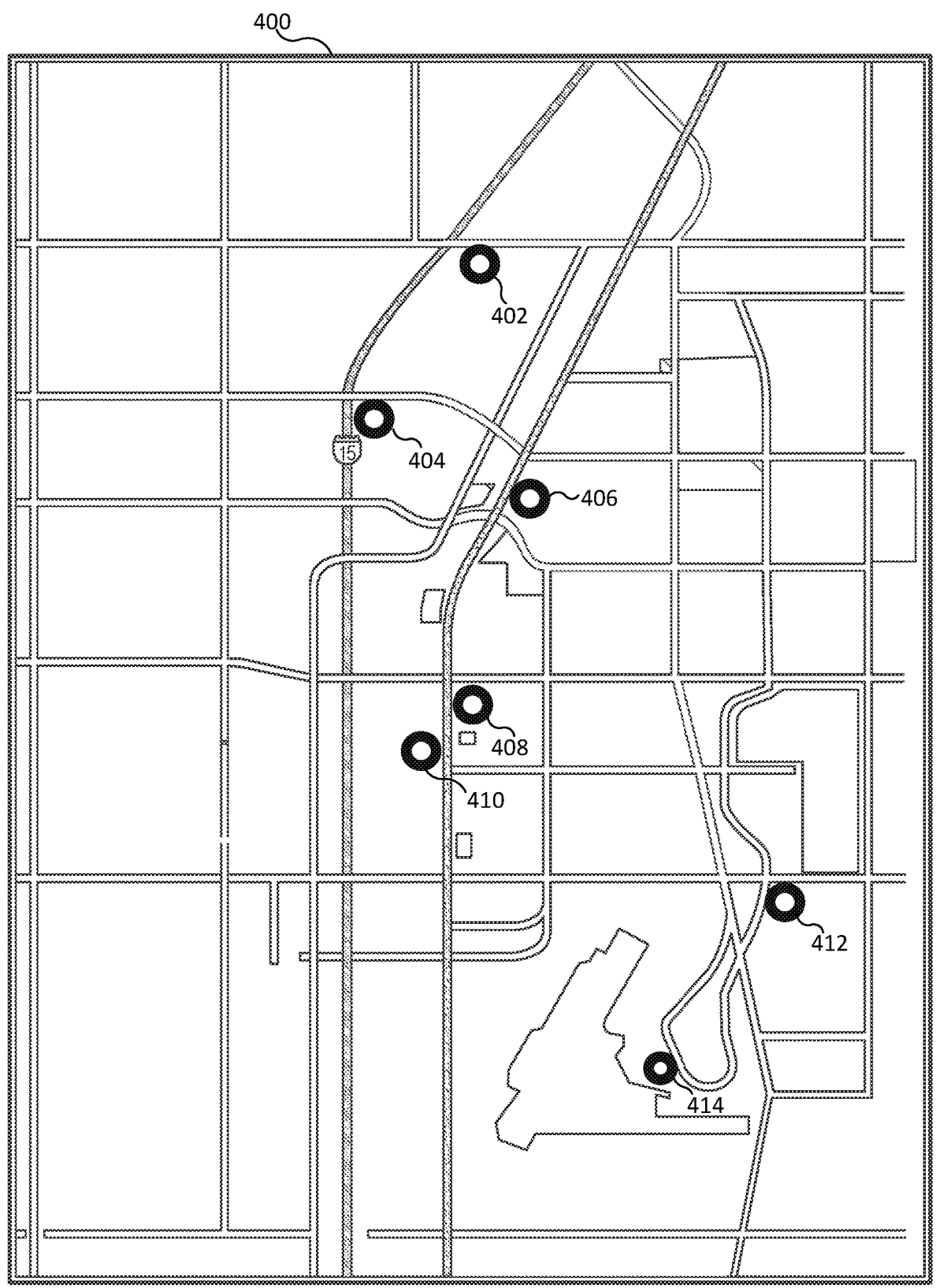
FIG. 4 is an illustration of a map of pickup and drop-off locations.

FIG. 4 is an illustration of a map of pickup and drop-off locations. As described with respect to FIG. 3, a dynamic transportation network may provide routing decisions to transportation provider devices to route transportation provider vehicles to pickup and drop-off locations based on the location scores of the locations. FIG. 4 shows map 400 with pickup and drop-off locations within a geographic area. Pickup and drop-off locations 402, 404, 406, 408, 410, 412, and 414 may each have a location score associated with their respective location. For example, pickup and drop-off location 402 may be located in a designated vehicle stop area and have a higher location score than pickup and drop-off location 404 that may be located on the side of a busy highway. As another example, pickup and drop-off location 406 may be located in an office complex and have a lower location score during normal working hours than on weekends or evenings when the level of vehicle traffic is significantly lower. As another example, pickup and drop-off locations 408 and 410 may be located in a downtown entertainment area and have lower location scores during evenings and weekends than during the daytime. Pickup and drop-off locations 412 and 414 may both be located within an airport. Pickup and drop-off location 412 may be located in an airport parking lot and have a higher location score than pickup and drop-off location 414 located in a busy arrival/departure area of the airport terminal. Each of the location scores of the pick and drop-off location may be based on, without limitation, a record of door closing events, the location of the door closing events, a time stamp of the door closing events detected by sensors and processors within the transportation provider vehicles, or a combination thereof. The location score may be higher for pickup/drop-off locations that are determined to be more convenient (e.g., right side of vehicle located on the right side of the road) than pickup/drop-off locations that are determined to be less convenient (e.g., left side of vehicle located on the right side of the road).

In some examples, a transportation provider may begin a transportation service by picking up a passenger and signaling the beginning of the transportation service. The transportation provider may end a transportation service by dropping off the passenger and signaling the end of the transportation service. The transportation provider may signal the beginning or end of the transportation service using any suitable method. The transportation provider may signal the beginning or end of the transportation service by making an entry on a computing device (e.g., smartphone). The entry may be touching an icon indicating the beginning or end of the transportation service on a touchscreen of a smartphone. The signal indicating the beginning or end of the transportation service may be transmitted to a transportation management system (e.g., transportation management system 1102 of FIG. 11). In some examples, a transportation provider may signal the beginning of a transportation service at a time and/or location that does not correspond to the actual pickup time or pickup location of the transportation requestor. In some examples, a transportation provider may signal the ending of a transportation service at a time and/or location that does not correspond to the actual drop off time or drop-off location of the transportation requestor. For example, a transportation provider may receive a request for transportation with a pickup location designated as pickup and drop-off location 414. The transportation provider may signal the beginning of the transportation service before actually picking up the transportation requestor thereby creating an inaccurate signaling of the time and/or location of picking up the transportation requestor. As another example, a transportation provider may receive a request for transportation with a drop-off location designated as pickup and drop-off location 408. The transportation provider may drop off the transportation requestor at pickup and drop-off location 408 without signaling the end of the transportation service. The transportation provider may then at a later time signal the end of the transportation service after actually dropping off the transportation requestor thereby creating an inaccurate signaling of the time and/or location of dropping off the transportation requestor. In some examples, detecting a door closing event on a transportation provider vehicle and recording a time stamp and location of the door closing event may create an accurate record of the actual times and locations of transportation pickups and drop-offs. A dynamic transportation network may calculate a time difference between a time of a door closing event and a time of a signal associated with the beginning or end of a transportation service. A dynamic transportation network may also calculate a difference between a location of a door closing event and a location of a transportation provider device when a signal associated with the beginning or end of a transportation service is entered. Further, the dynamic transportation network may determine a transportation provider rating based at least in part on the time and/or location difference.

In some examples, the dynamic transportation network may estimate the location of a transportation requestor based on a Global Positioning System sensor and/or a choosing a location on a map application running on a computing device. The dynamic transportation network may then infer a more accurate pickup/drop-off location based on popular pickup/drop-off locations nearby. The more popular pickup/drop-off locations may be determined by the record of door closing event locations stored in a database. Additionally or alternatively, the dynamic transportation network may recommend a different pickup/drop-off location nearby that is more convenient and/or appropriate for the transportation requestor and/or the transportation provider.

In some examples, a specific street address may be provided for a location that covers a large geographic area (e.g., a shopping mall, an office complex, an event stadium, etc.). The street address may be an inconvenient and/or inappropriate pick/drop-off location. The dynamic transportation network may adjust the pickup/drop-off location to a nearby location that is more convenient and/or appropriate for the transportation requestor and/or the transportation provider. The adjusted pickup/drop-off locations may be based on the record of door closing event locations stored in a database. In some examples, the adjusted pickup/drop-off locations may be further based on feedback provided by transportation requestors that have previously been picked up or dropped off at the specific street address. The feedback from the transportation providers may indicate the level of convenience associated with the adjusted location. Creating a database of locations of door closing events determined using sensor data obtained from transportation provider computing devices may enable more accurate, reliable and convenient pickup and drop off locations for transportation requestors.

In some examples, the dynamic transportation network may identify discrepancies between a pickup and/or drop-off location requested by a transportation requestor and the actual location of the pickup and/or drop-off location. The pickup and/or drop-off location requested by a transportation requestor may be determined by the transportation requestor entering a location (e.g., address) of the pickup and/or drop-off location in an application of the transportation requestor's device, the location determined by a location determining system (e.g., GPS) in the transportation requestor's device, or a combination thereof. The actual location of the pickup and/or drop-off location may be determined by the location of a door closing event, the entry of a pickup/drop-off in the transportation provider's computing device, or a combination thereof. In some examples, the transportation requestor may provide feedback (e.g., through the transportation requestor's computing device) to the dynamic transportation network regarding the actual pickup/drop-off location. The transportation requestor's feedback may indicate that the actual pickup/drop-off location was not the transportation requestor's desired location. The dynamic transportation network may provide instructions to the transportation provider to assist the transportation provider in picking up/dropping off the transportation requestor at a location that is more desirable to the transportation requestor. In some examples there may be a consistent mismatch between the actual pickup/drop-off location and the requested pickup/drop-off location that may indicate the requested pickup/drop-off location is not an appropriate or convenient location. When there is a consistent mismatch, the dynamic transportation network may mark the location as inappropriate for pickup/drop-off and route transportation requestors to an alternate nearby location. The dynamic transportation network may obtain information regarding the inappropriate pickup/drop-off location through automated data collection (e.g., image sensors on vehicles or computing devices) and/or through investigative methods. The dynamic transportation network may update map data based on the collected data or investigation results.

In some examples, the transportation requestor may provide feedback (e.g., through the transportation requestor's computing device) to the dynamic transportation network that the actual pickup/drop-off location was a convenient and/or appropriate pickup/drop-off location. The dynamic transportation network may update map data based on the transportation requestor's feedback indicating that the actual pickup/drop-off location is an appropriate replacement for the originally requested pickup/drop-off location.

In some examples, the dynamic transportation network may assign a location score (e.g., number value) to the transportation requestor based on the transportation requestor's ability to pick and/or drop off transportation requestors at a convenient location. A high location score may indicate a strong ability for the transportation provider to pick and/or drop off transportation requestors at a convenient location. The dynamic transportation network may match a transportation provider with a transportation requestor based on the transportation provider's location score. For example, if a transportation requestor provides feedback that having a convenient and/or accurate pickup location is of high importance, the dynamic transportation network may match the transportation requestor with a transportation provider having a high location score. As another example, certain locations may be difficult to conveniently pickup/drop-off transportation requestors, however certain transportation requestors may have a record of consistently picking up/dropping off transportation requestors at that location. The dynamic transportation network may match a transportation requestor that has requested a pickup/drop-off at that location with a transportation provider having a record of consistently picking up/dropping off transportation requestors at that location.

Figure 5:
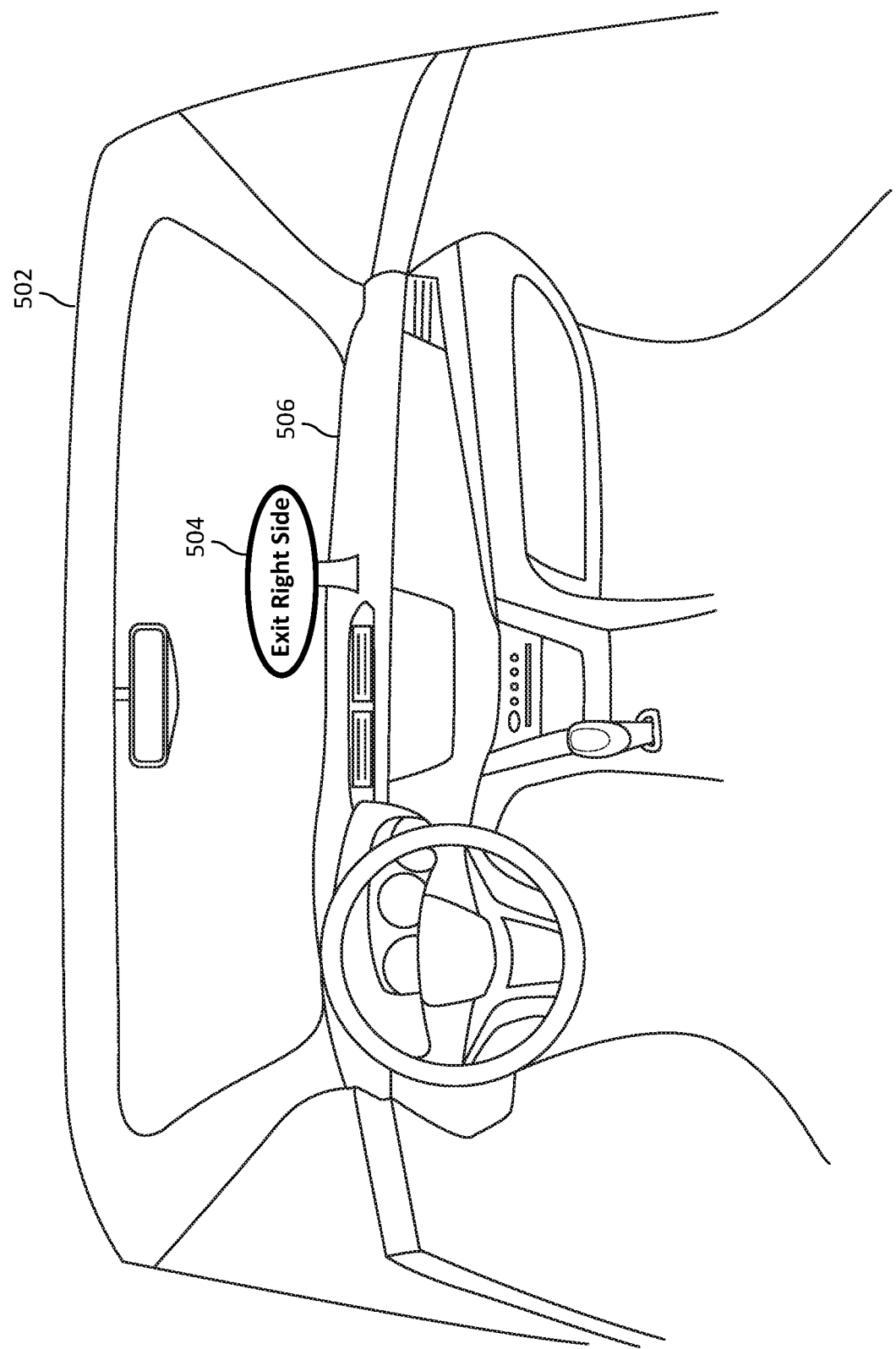
FIG. 5 is an illustration a computing device mounted on the dashboard of a vehicle.

FIG. 5 is an illustration a computing device mounted on the dashboard of a vehicle. FIG. 5 shows the interior dashboard area of vehicle 502 with computing device 504 securely mounted on dashboard 506. In some examples, the computing device may be a computing device of a transportation provider (e.g., smartphone) and the vehicle may be a transportation provider vehicle that provides transportation services. Computing device 504 may be a message display device that displays messages on a screen. Computing device 504 may display messages to transportation requestors traveling in vehicle 502. The messages displayed on computing device 504 may provide information associated with a current transportation service. The displayed information may include door usage guidance to transportation requestor(s) that guides the transportation requestor(s) as to which door the transportation requestor(s) should use when entering or exiting vehicle 502. For example, a transportation provider may stop vehicle 502 on the right side of road and message "Exit Right Side" may be displayed on computing device 504 to guide the transportation requestor to exit the vehicle on the right side. A dynamic transportation network may detect door closing events based on sensor data (e.g., gyroscope sensor data), store a historical record of the door closing events, and determine transportation provider routing decisions based on the record of the door closing events. In some examples, the routing decisions may include providing guidance to a transportation requestor on computing device 504 as to which door the transportation requestor should enter or exit the vehicle. The routing decisions may also include controlling locking mechanisms on the vehicle doors. For example, vehicle 502 may lock the left door of the vehicle, unlock the right door, and display message "Exit Right Side" on computing device 504 to guide the transportation requestor to exit the vehicle on the right side.

Additionally or alternatively, computing device 504 may include a processor (e.g., processor 720 of FIG. 7) and a gyroscope sensor. The processor may receive sensor data from the gyroscope. The gyroscope may measure angular velocity and acceleration in multiple directions (e.g., 3 dimensional). When computing device 504 is securely mounted to dashboard 506 within vehicle 502, the gyroscope may subject to vehicle movements and may therefore measure the pitch, roll, and yaw of vehicle 502. For example, the gyroscope may measure the pitch, roll, and yaw of computing device 504 corresponding to axes X, Y, and Z, respectively, of vehicle 502. In some examples, a door closing on vehicle 502 may cause an impact acceleration to the vehicle. The impulse momentum imparted on the vehicle may be transmitted to computing device 504 securely mounted to dashboard 506. The gyroscope may measure the impulse momentum and produce sensor data associated with the impulse. As will be described in detail with respect to FIGS. 7 and 8, sensor data from the gyroscope may indicate a change in the pitch, roll, and yaw of vehicle 502 caused by the closing door. In some examples, the roll axis of vehicle 502 may experience the highest change in rotational velocity as compared to the pitch axis (e.g., X axis) and the yaw axis (e.g., Z axis). The processor may determine an event signature from the gyroscope sensor data and detect that the event signature indicates a door closing event has occurred.

Figure 6:
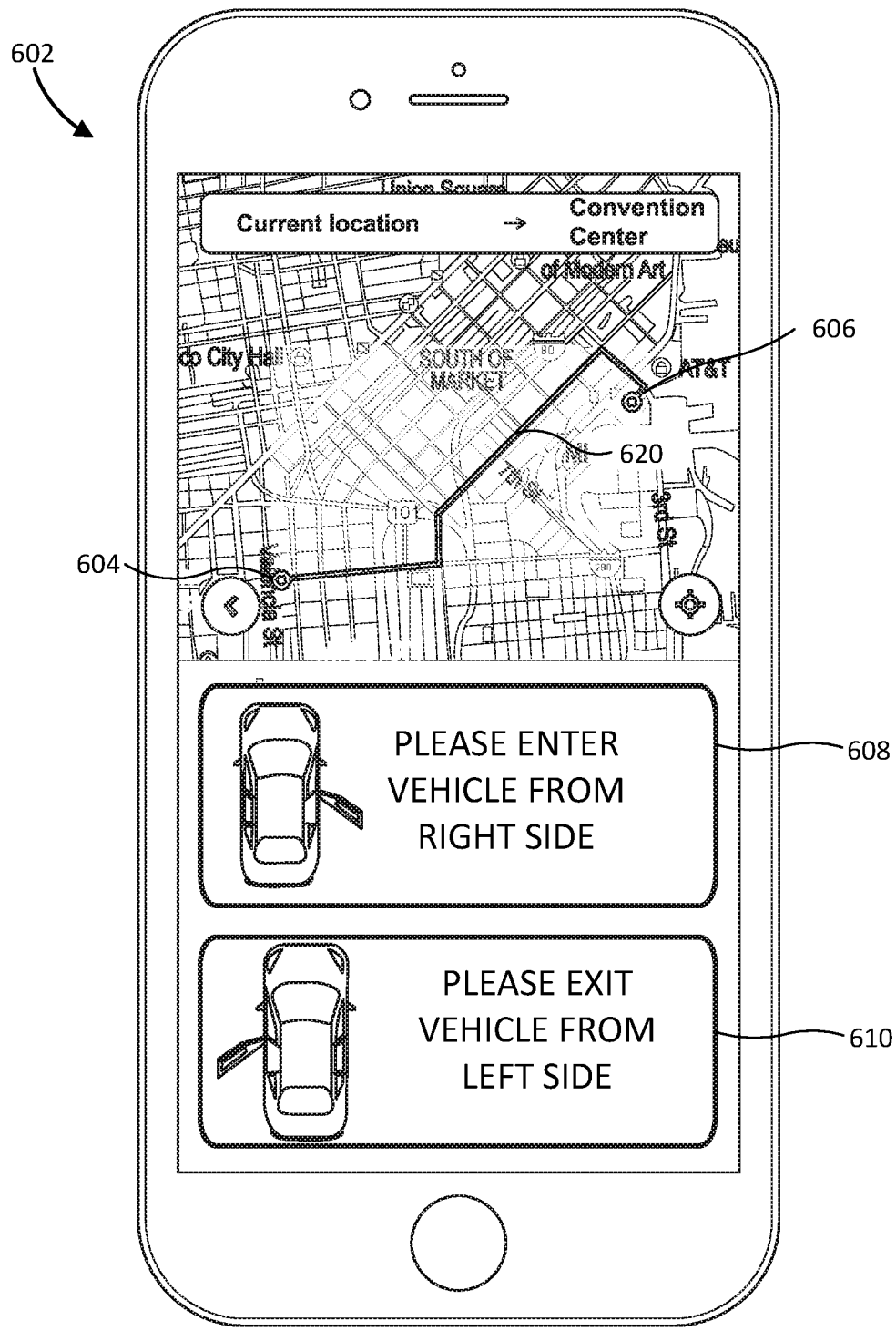
FIG. 6 is an illustration of an example method of providing door usage guidance to a transportation requestor device.

FIG. 6 is an illustration of an example method of providing door usage guidance to a transportation requestor device. A dynamic transportation network may provide information to a transportation requestor device (e.g., smartphone) related to transportation services. For example, smartphone 602 may display a route on a map associated with a transportation request. The route may be displayed on the map and include pickup location 604, travel route 620, and drop-off location 606. Further, smartphone 602 may display messages to the transportation requestor associated with door usage guidance. For example, smartphone 602 may display message 608 providing guidance to the transportation requestor to enter the transportation provider vehicle from the right side of the vehicle at pickup location 604. As another example, smartphone 602 may display message 610 providing guidance to the transportation requestor to exit the transportation provider vehicle from the left side of the vehicle at drop-off location 606. A dynamic transportation network may detect door closing events based on sensor data, store a historical record of the door closing events, and determine transportation provider routing decisions based on the record of door closing events. In some examples, the routing decisions may include providing guidance on smartphone 602 to a transportation requestor to enter the transportation provider vehicle from the right side of the vehicle at pickup location 604 and exit the transportation provider vehicle from the left side of the vehicle at drop-off location 606.

Figure 7:
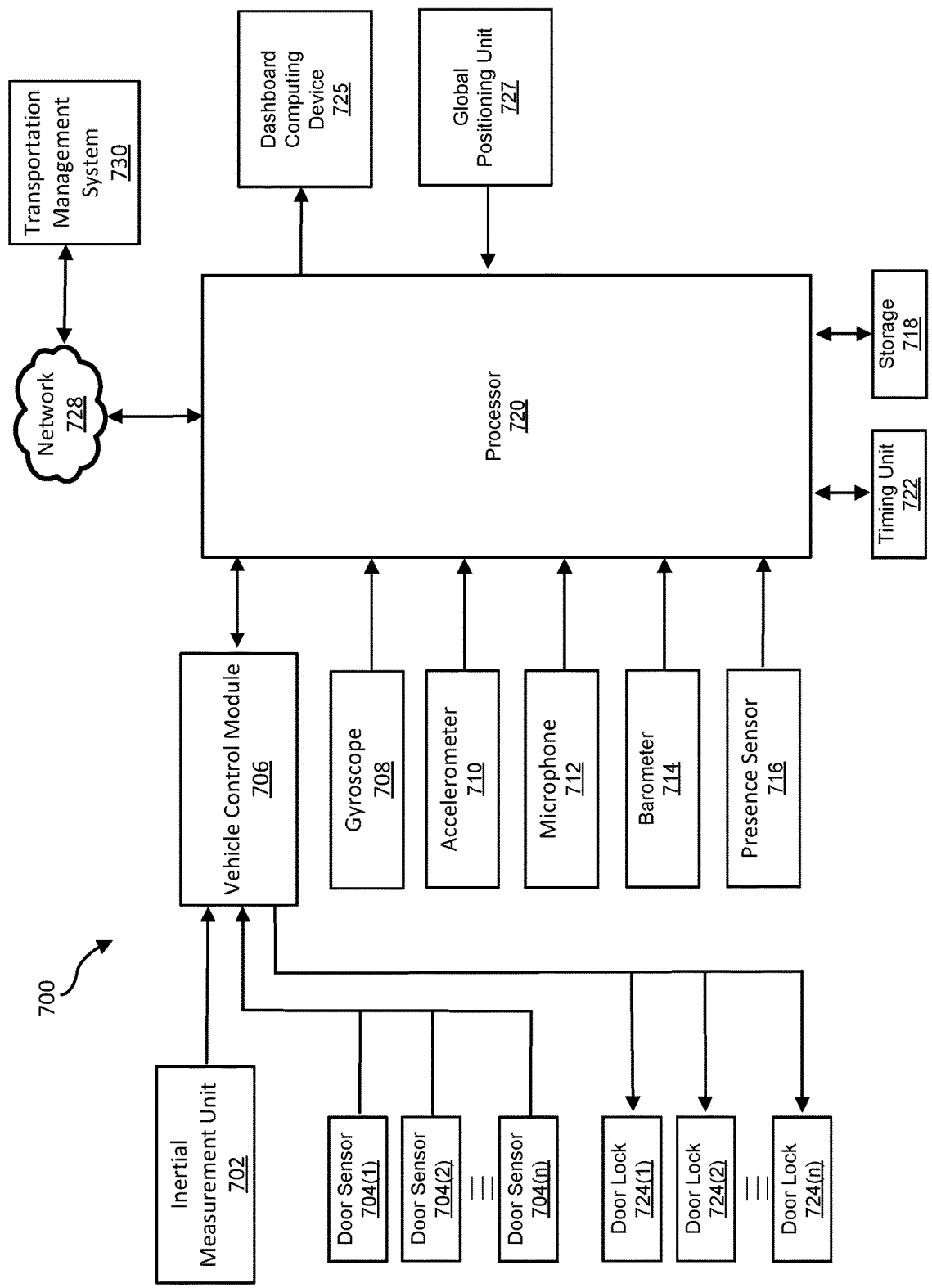
FIG. 7 is a block diagram of an example system for detecting vehicle door closings.

FIG. 7 is a block diagram of an example system for detecting vehicle door closings. As described above in FIGS. 1-6 a dynamic transportation network may provide transportation provider routing decisions to a transportation provider device based on a historical record of door closing events. As shown in FIG. 7, system 700 is an example system for detecting vehicle door closings. Vehicle door closings may be detected using any suitable method and system. System 700 may include processor 720 that may receive sensor data from multiple sensors and data sources. Processor 720 may execute instructions stored in storage 718 that processes the sensor data and detects vehicle door closings. Processor 720 may be included in a computing device of a transportation provider that operates the vehicle. In some examples, processor 720 may be included in a computing module of the vehicle. Processor 720 may receive sensor data from gyroscope 708. Gyroscope 708 may also be included in the computing device of the transportation provider operating the vehicle. Gyroscope 708 may measure angular velocity and acceleration in multiple directions (e.g., 3 dimensional). For example, gyroscope 708 may measure the pitch, roll, and yaw of the computing device that includes gyroscope 708. When a computing device that includes gyroscope 708 is securely mounted within a vehicle, gyroscope 708 may subject to the vehicle movements and may therefore measure the pitch, roll, and yaw of the vehicle in which it is mounted. In some examples, a door closing on a vehicle may cause an impact acceleration to the vehicle. A closing door may have a momentum equal to the mass of the door times the door velocity as it is closing. When the door is closed, and the velocity goes to zero, an impulse momentum may be imparted on the vehicle. The impulse momentum imparted on the vehicle may be transmitted through the vehicle to the computing device securely mounted in the vehicle. Gyroscope 708 may measure the impulse momentum transmitted to the computing device and output sensor data associated with the impulse. The sensor data from gyroscope 708 may indicate a change in the pitch, roll, and yaw of the vehicle. In some examples, the roll axis (e.g., longitudinal axis) of the vehicle may experience the highest change in acceleration as compared to the pitch axis (e.g., transverse axis) and the yaw axis (e.g., vertical axis). Processor 720 may process the sensor data from gyroscope 708 and determine that the sensor data indicates a door closing event has occurred. Processor 720 may determine the amplitude and frequency components of the sensor data from gyroscope 708 using processing techniques including, without limitation, Fast Fourier Transform, time domain digital signal processing, linearization, filtering, finite impulse response, or a combination thereof. In some examples, processor 720 may compare the amplitude and frequency components (e.g., an event signature pattern) of the sensor data from gyroscope 708 to known gyroscope signature patterns of door closing events to determine if a door closing event has occurred.

Processor 720 may receive sensor data from accelerometer 710. Accelerometer 710 may also be included in the computing device of the transportation provider operating the vehicle. Accelerometer 710 may measure linear acceleration in multiple directions (e.g., 3 dimensional). For example, accelerometer 710 may measure linear acceleration in the longitudinal, transverse, and vertical axis of the vehicle when the computing device is securely attached to the vehicle. Similar to gyroscope 708, accelerometer 710 may be subject to vehicle movements and may therefore measure linear acceleration of the vehicle in any direction. In some examples, a door closing on a vehicle may cause an impact acceleration to the vehicle. When the door is closed, and the velocity goes to zero, an impulse momentum may be imparted on the vehicle. The impulse momentum imparted on the vehicle may be transmitted to the computing device securely mounted in the vehicle. Accelerometer 710 may measure the impulse momentum transmitted to the computing device and output sensor data associated with the impulse. The sensor data from accelerometer 710 may indicate a change in the linear acceleration of the vehicle caused by the impulse of the closing door. Processor 720 may process the sensor data from accelerometer 710 and determine that the sensor data indicates a door closing event has occurred. Processor 720 may determine the amplitude and frequency components of the sensor data from accelerometer 710 using processing techniques including, without limitation, Fast Fourier Transform, time domain digital signal processing, linearization, filtering, finite impulse response, or a combination thereof. In some examples, processor 720 may compare the amplitude and frequency components (e.g., an event signature pattern) of the sensor data from accelerometer 710 to known accelerometer signature patterns of door closing events to determine if a door closing event has occurred.

Processor 720 may receive sensor data from microphone 712. Microphone 712 may also be included in the computing device of the transportation provider operating the vehicle. Microphone 712 may sense sound waves in proximity to the computing device. For example, microphone 712 may sense sound waves within the cabin of the vehicle. In some examples, a door closing on a vehicle may cause an impact sound wave. The impact sound wave caused by the closing door may be sensed and recorded by microphone 712. Processor 720 may process the recorded sound wave from microphone 712 and determine that the sound wave indicates a door closing event has occurred. Processor 720 may determine the amplitude and frequency components of the recorded sound wave using processing techniques including, without limitation, Fast Fourier Transform, time domain digital signal processing, linearization, filtering, finite impulse response, or a combination thereof. In some examples, processor 720 may compare the amplitude and frequency components (e.g., a sound wave pattern) of the recorded sound wave to known sound wave patterns of door closing events to determine if a door closing event has occurred.

In some examples, a door closing event may be detected by a combined gyroscope and sound level event signature. When the computing device is securely attached to the vehicle, the sensor data from gyroscope 708 may represent the angular velocity of the vehicle in multiple directions (e.g., 3 dimensional). The sensor data from microphone 712 may represent the sound pressure level inside the cabin of the vehicle. The computing device may simultaneously receive sensor data from the gyroscope and sound pressure levels from the microphone.

When a door of the vehicle is closed, the vehicle may experience an impact. Each of the door closing events may produce gyroscope and sound level data that corresponds to the door closing event. In some examples, the gyroscope and microphone may record a unique event signature that corresponds the door closing events. For example, during a door closing event, the sound level data may show an initial increase in amplitude (e.g., impulse) when the door closes and a dampened level from echoes in the vehicle cabin while the y axis of the gyroscope may show an initial increase in amplitude in the negative rotational direction. A combined (e.g., gyroscope and sound pressure level) event signature may increase the accuracy of detecting car door closing events. By correlating a gyroscope event signature with a sound level event signature false positive and/or false negative door closing detection may be reduced. For example, if a vehicle receives an impact not due to a door closing (e.g.

from an external object/person impacting the vehicle or from a passing truck creating an air pressure wave) an event signature from a gyroscope alone may falsely indicate a door closing event. A vehicle impact not due to a door closing event may generate a sound level signature distinguishable from a door closing sound level signature while the gyroscope data signature may not be able to distinguish between the door closing event and an impact due to another source. By correlating the gyroscope and sound level signatures a more robust (e.g. reducing false positive detection and/or false negative detection) event signature detection method is created. Correlating the gyroscope and sound level signatures may use any suitable method. For example, correlation methods may include time synchronization (e.g., temporal correlation) of peaks detected by the gyroscope and microphone and a weighting applied to each of the gyroscope and sound level signatures. In some examples, a machine learning model may be applied to the event signature methods independently or in a combined manner. The machine learning model may be developed by providing training sets of known gyroscope and/or sound level data associated with door closing events to the model.

Processor 720 may receive sensor data from barometer 714. Barometer 714 may also be included in the computing device of the transportation provider operating the vehicle. Barometer 714 may sense ambient air pressure in proximity to the computing device. For example, barometer 714 may sense ambient air pressure within the cabin of the vehicle. In some examples, a door closing on a vehicle may cause a change (e.g., sudden increase) in the relative air pressure within the cabin of the vehicle. The change in relative air pressure within the cabin of the vehicle caused by the closing door may be sensed and recorded by barometer 714. Processor 720 may receive and process sensor data including the change in relative air pressure from barometer 714 and determine that the change in relative air pressure indicates a door closing event has occurred. Processor 720 may determine the amplitude and frequency components of the recorded change in relative air pressure using processing techniques including, without limitation, Fast Fourier Transform, time domain digital signal processing, linearization, filtering, finite impulse response, or a combination thereof. In some examples, processor 720 may compare the amplitude and frequency components (e.g., air pressure wave pattern) of the recorded air pressure to known air pressure wave patterns of door closing events to determine if a door closing event has occurred.

Processor 720 may receive sensor data from presence sensor 716. Presence sensor 716 may also be included in the computing device of the transportation provider operating the vehicle. When the computing device is mounted in the vehicle, presence sensor 716 may sense the presence, absence, status, and/or position of objects within the vehicle. Presence sensor 716 may use sensing technologies including, without limitation, image processing, radar ranging, laser ranging, radio frequency identification, or a combination thereof. Processor 720 may receive and process sensor data from presence sensor 716 and determine that the sensor data indicates a door closing event has occurred. In some examples, processor 720 may process sensor data from presence sensor 716 and determine, without limitation, a number of transportation requestors within the vehicle, an activity of a transportation requestor, a presence, absence or position of a transportation provider, an activity of a transportation provider, a door position, a window position, a seat position, or a combination thereof.

In some examples, processor 720 may receive sensor data related to door closing events from sensors located outside of a computing device of the transportation provider. For example, processor 720 may receive sensor data from a computing device of a passenger or a transportation requestor. Sensor data from a computing device of a passenger or a transportation requestor may be transmitted to processor 720. Processor 720 may also receive sensor data from sensors within the vehicle. The vehicle may include inertial measurement unit 702 that may sense and record rotational velocity and linear acceleration similar to gyroscope 708 and accelerometer 710 described above. For example, inertial measurement unit 702 may measure the pitch, roll, and yaw of the vehicle. In some examples, a door closing on the vehicle may cause an impulse momentum to be imparted on the vehicle. The impulse momentum due to the door closing may be recorded by inertial measurement unit 702. Inertial measurement unit 702 may also include an accelerometer that measures acceleration in the longitudinal, transverse, and vertical axis of the vehicle. Similar to the gyroscope in inertial measurement unit 702, the accelerometer may sense linear acceleration of the vehicle caused by a door closing event. Sensor data from the gyroscope and/or accelerometer in inertial measurement unit 702 may be provided to vehicle control module 706. Vehicle control module 706 may pass the sensor data to processor 720 and/or vehicle control module 706 may preprocess (e.g., condition) the sensor data before passing the sensor data to processor 720. Processor 720 may process the sensor data from inertial measurement unit 702 and determine that the sensor data indicates a door closing event has occurred. Processor 720 may determine the amplitude and frequency components of the sensor data from inertial measurement unit 702 using processing techniques including, without limitation, Fast Fourier Analysis, time domain digital signal processing, linearization, filtering, finite impulse response, or a combination thereof. In some examples, processor 720 may compare the amplitude and frequency components (e.g., an event signature pattern) of the sensor data from inertial measurement unit 702 to known signature patterns of door closing events to determine if a door closing event has occurred.

In some examples, processor 720 may receive sensor data related to door closing events from door sensors located on the vehicle. For example, each door on the vehicle (e.g., front right door, front left door, rear right door, rear left door, rear door, hood, trunk, etc.) may have a sensor that indicates an open or closed status of the door. The vehicle may include door sensors 704(1) to 704(n). Door sensors 704(1) to 704(n) may each sense an individual door status on the vehicle. Each of door sensors 704(1) to 704(n) may send a door status to vehicle control module 706. Vehicle control module 706 may further send the door status to processor 720. Processor 720 may determine door closing events based on the status of door sensors 704(1) to 704(n). In one example, door sensor 704(1) may sense the door status of the right rear door of the vehicle and door sensor 704(2) may sense the door status of the left rear door of the vehicle. Processor 720 may determine that a transportation requestor has entered or exited the vehicle based on receiving a door open status from door sensor 704(1) or 704(2) and a period of time later receiving a door closed status from door sensor 704(1) or 704(2). Further, processor 720 may determine the number of transportation requestors that have entered or exited the vehicle based on the time period between the door open status and the door closed status. Processor 720 may receive timing information from timing unit 722. Timing unit 722 (e.g., crystal oscillator) may provide processor 720 with a timing base to determine the time period between the door open status and the door closed status. Further, timing unit 722 may provide processor 720 with a time of day and date. Processor 720 may create record of door opening and closing events and include the time of day and date associated with the door events. Processor 720 may receive location information associated with the door closing events from global positioning unit 727. Processor 720 may store the record of door closing events including the location, time of day, and date in storage 718. Further, the record of door closing events including the location, time of day, and date may be uploaded through network 728 to a server for access by transportation management system 730.

In some examples, processor 720 may control access to the vehicle. Processor 720 may control access to the vehicle by controlling the locking and unlocking of the vehicle doors (e.g., front right door, front left door, rear right door, rear left door, rear door, hood, trunk, etc.). Processor 720 may control the locking and unlocking of the vehicle doors by sending a control signal to vehicle control module 706. Vehicle control module 706 may send a signal (e.g., control message over a vehicle communications bus or a discrete signal) to door locks 724(1) to 724(n) to lock or unlock the doors. Processor 720 may lock or unlock vehicle doors in order to control which side of the vehicle a passenger (e.g., transportation requestor) is allowed to enter or exit. For example, a transportation provider may provide transportation services to a transportation requestor and stop the vehicle on the right side of a road to drop off the transportation requestor. The transportation provider may stop the vehicle alongside a curb or sidewalk on the right side of the vehicle. Processor 720 may lock a door on the left side of the vehicle and unlock a door on the right side of the vehicle, so the transportation requestor may exit the vehicle next to the curb or sidewalk.

In some examples, processor 720 may communicate with vehicle control module 706 to receive sensor data and/or control door locks over a vehicle interface bus. Processor 720 may communicate with vehicle control module 706 over a wired communications interface conforming to the On-Board Diagnostics (OBDII) standard. In some examples, processor 720 may communicate with vehicle control module 706 and/or other computing devices within the vehicle over a wireless communications interface (e.g., Bluetooth™, WiFi, cellular, Near Field Communication, etc.).

Although the above described embodiments disclose methods of detecting door closing events using individual types of sensors, the present disclosure is not limited to such and the methods include using a combination of sensor data from various types of sensors to detect door closing events. Embodiments of the present disclosure include detecting door closing events based on sensor data from, without limitation, a gyroscope, an accelerometer, a microphone, a barometer, a presence sensor, a vehicle IMU, a vehicle door sensor, or a combination thereof.

Additionally or alternatively, processor 720 may receive sensor data from any or all of the sensors described above and transmit the sensor data to transportation management system 730. Transportation management system 730 may be transportation management system 902 described in detail below with respect to FIG. 9. Transportation management system 730 may receive the sensor data transmitted from processor 720 through network 728. Network 728 may be network 910 or network 920 of FIG. 9. Transportation management system 730 may receive the sensor data and determine an event signature based on the sensor data. Further, transportation management system 730 may detect a door closing event associated with the vehicle based on the event signature. Transportation management system 730 may store a record of data associated with door closing events detected by processor 720 and a record of data associated with door closing events detected in other transportation provider vehicles.

In some examples, transportation management system 730 may determine vehicle routing decisions based on the record of door closing events and locations associated with the door closing events. Transportation management system 730 may transmit the vehicle routing decisions to processor 720 through network 728. The vehicle routing decisions may be provided to a transportation provider through a transportation provider device and/or dashboard computing device 725.

Figure 8:
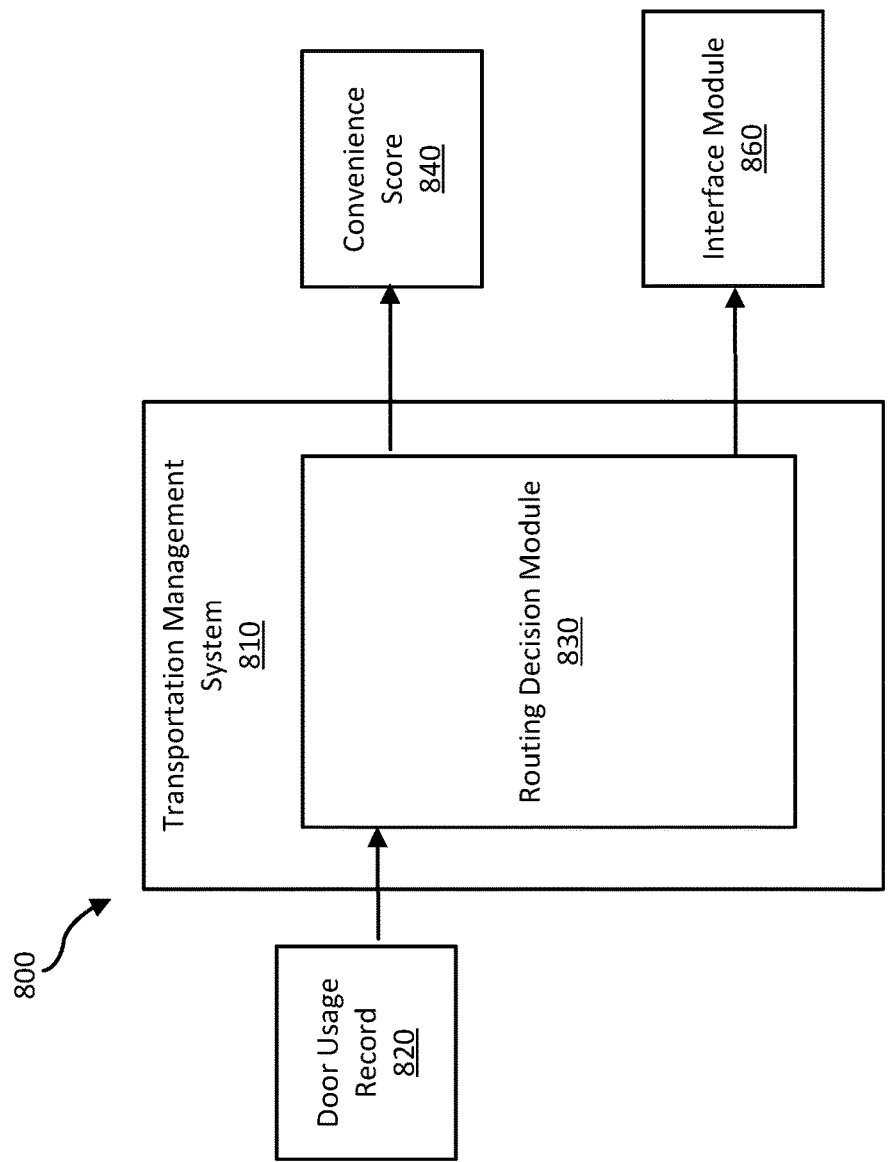
FIG. 8 is a block diagram of example modules for determining transportation provider routing decisions.
Figure 9:
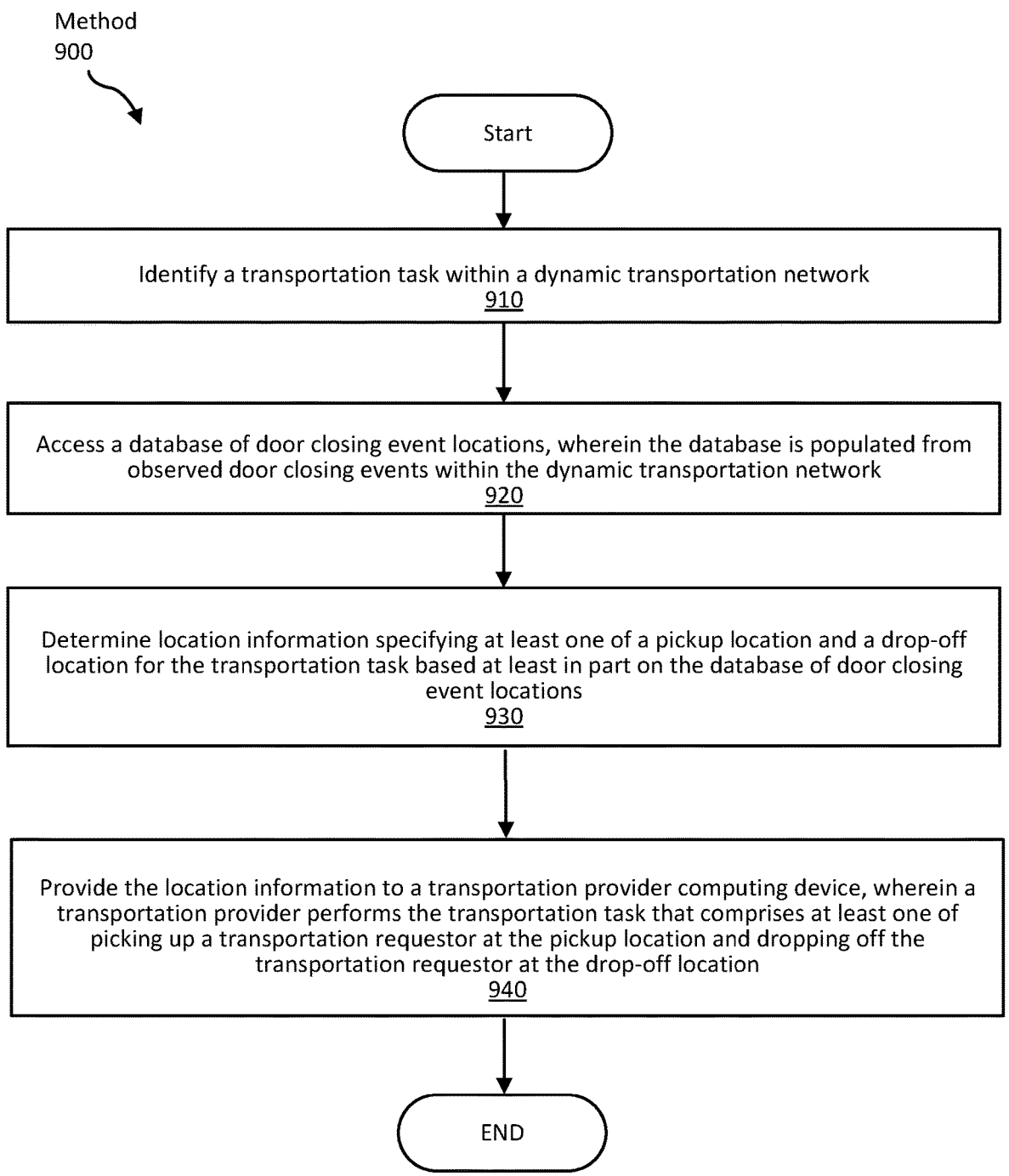
FIG. 9 is a flow diagram of an example method for providing a routing decision to a transportation provider device based on a historical record of door closing events.

FIG. 8 is a block diagram of example modules for determining transportation provider routing decisions based on data associated with vehicle door closings. The modules of FIG. 8 may receive door closing event data, determine transportation provider routing decisions based on the door closing event data, and provide the routing decisions to a transportation provider device. Transportation management system 810 may include routing decision module 830. In some examples, transportation management system 810 may be transportation management system 1102 of FIG. 11. Door usage record 820 may store data associated with door closing events from multiple transportation provider devices and may include the location of the vehicles at the time of the door closings, the day and time of the door closings, a number of passengers entering the vehicle through the door, etc. Routing decision module 830 may receive data associated with door closing events from door usage record 820. Routing decision module 830 may determine routing decisions including transportation requestor pickup locations, transportation requestor drop-off locations, and transportation requestor door usage guidance. The routing decisions from routing decision module 830 may be provided to interface module 860 for transmission to, without limitation, transportation provider devices, dashboard mounted computing devices, vehicle control modules, transportation requestor devices, or a combination thereof. The routing decisions from routing decision module 830 may be based on the location scores of pickup and drop-off locations. For example, routing decision module 830 may determine a travel route for a transportation provider such that a transportation requestor is picked up or dropped off at a location that has a higher location score (e.g., curbside or a designated pickup/drop-off location).

Routing decision module 830 may determine and store transportation provider location scores in transportation provider location score 840. As described above with respect to FIG. 4, a dynamic transportation network may calculate a time difference between a time of a door closing event and a time of a signal associated with the beginning or end of a transportation service. Routing decision module 830 may calculate a difference between a location of a door closing event and a location of a transportation provider device when a signal associated with the beginning or end of a transportation service is entered. Routing decision module 830 may determine a transportation provider location score based at least in part on the time and/or location difference and store the transportation provider location scores in transportation provider location score 840.

Additionally or alternatively, a transportation provider location score may be based on door closing event data and the location scores of pickup and drop-off locations associated with the transportation provider. For example, a transportation provider that frequently picks up or drops off transportation providers at locations with lower location scores may have a lower transportation provider location score than a transportation provider that consistently picks up or drops off transportation providers at locations with higher location scores.

In some examples, a dynamic transportation network may match transportation requests to transportation providers based on the transportation provider location scores. For example, a dynamic transportation network may receive a transportation request for which there are multiple available transportation providers to fulfill the request. The dynamic transportation network may match the request with a transportation provider based on the location scores of the available providers (e.g., the dynamic transportation network may match the request with the transportation provider having the location score over a threshold).

FIG. 9 is a flow diagram of an example method for providing a transportation provider routing decision to a transportation provider device based on a historical record of vehicle door closing events. As shown in FIG. 9, the method may include, at step 910, identifying a transportation task within a dynamic transportation network. At step 920, the method may include accessing a database of door closing event locations, wherein the database is populated from observed door closing events within the dynamic transportation network. At step 930, the method may include determining location information specifying at least one of a pickup location and a drop-off location for the transportation task based at least in part on the database of door closing event locations. At step 940, the method may include providing the location information to a transportation provider computing device, wherein a transportation provider performs the transportation task that comprises at least one of picking up a transportation requestor at the pickup location, and dropping off the transportation requestor at the drop-off location.

In one example, a computer-implemented method for providing transportation provider routing decisions to a transportation provider device based on a historical record of vehicle door closing events may include identifying a transportation task within a dynamic transportation network. In some examples, the method may further include accessing a database of door closing event locations. In some examples, the method may further include determining location information specifying at least one of a pickup location and a drop-off location for the transportation task based at least in part on the database of door closing event locations. In some examples, the method may further include providing the location information to a transportation provider computing device, wherein a transportation provider performs the transportation task that comprises at least one of picking up a transportation requestor at the pickup location, and dropping off the transportation requestor at the drop-off location.

In some examples, the method may further include retrieving, from the database of door closing event locations, a time of a door closing event at a location, determining the location information for at least one of the pickup location and the drop-off location based on retrieving, from the database of door closing event locations, the time of the door closing event at the location.

In some examples, the method may further include retrieving, from the database of door closing events, historical event data at the drop-off location and determining whether a driver side door exit or a passenger side door exit is more convenient for a transportation requestor exiting a transportation provider vehicle based on the database of door closing events.

In some examples, the method may further determining whether a number of driver side door closing events occurring at a location is greater than a threshold and in response to the number of driver side door closing events occurring at the location being greater than a threshold, performing at least one of instructing the transportation provider to remind the transportation requestor to exit a transportation provider vehicle through a passenger side door, instructing the transportation provider to travel to a location at which the transportation requestor may exit the transportation provider vehicle through the passenger side door, instructing the transportation provider to query the transportation requestor as to which side of a street the transportation requestor prefers to exit the transportation provider vehicle, and instructing the transportation requestor as to which door of the transportation provider vehicle to exit.

In some examples, the method may further include unlocking at least one door locking mechanism on a side of a transportation provider vehicle at the at least one of the pickup location and the drop-off location, wherein the side of the transportation provider vehicle that is unlocked is based at least in part on the database of door closing event locations.

In some examples, the method may further include receiving a time stamp associated with an end transportation signal or a begin transportation signal from the transportation provider computing device, receiving a time stamp associated with a door closing event on a transportation provider vehicle, calculating a time difference between the time stamp associated with the end transportation signal or the begin transportation signal and the time stamp associated with the door closing event.

In some examples, the observed door closing events may be based on sensor data and the sensor data is received from at least one of an accelerometer, a gyroscope, a barometer, and a magnetometer within the transportation provider computing device.

In some examples, the method may further include identifying popular pickup locations and drop-off locations based at least in part on the database of door closing event locations and providing a recommendation of at least one of the popular pickup locations and drop-off locations to the transportation provider device.

In some examples, the method may further include assigning a convenience score to the transportation provider based on a level of convenience provided to the transportation requestor in performing the transportation task and matching the transportation provider to another transportation requestor in response to the convenience score exceeding a threshold.

In some examples, the method may further include receiving feedback from the transportation requestor associated with a level of convenience of the at least one of the pickup location and the drop-off location and updating map data based on the feedback.

In some examples, the method may further include identifying a discrepancy between at least one of a planned pickup location and an actual pickup location, and a planned drop-off location and an actual drop-off location.

In one example, a system may comprise one or more physical processors and one or more memories coupled to one or more of the physical processors, the one or more memories comprising instructions operable when executed by the one or more physical processors may cause the system to perform operations including accessing a database of door closing event locations. In some examples, the operations may further include determining location information specifying at least one of a pickup location and a drop-off location for the transportation task based at least in part on the database of door closing event locations. In some examples, the operations may further include providing the location information to a transportation provider computing device, wherein a transportation provider performs the transportation task that comprises at least one of picking up a transportation requestor at the pickup location, and dropping off the transportation requestor at the drop-off location.

In some examples, the operations may further include retrieving, from the database of door closing event locations, a time of a door closing event at a location, determining the location information for at least one of the pickup location and the drop-off location based on retrieving, from the database of door closing event locations, the time of the door closing event at the location.

In some examples, the operations may further include retrieving, from the database of door closing events, historical event data at the drop-off location and determining whether a driver side door exit or a passenger side door exit is more convenient for a transportation requestor exiting a transportation provider vehicle based on the database of door closing events.

In some examples, the operations may further determining whether a number of driver side door closing events occurring at a location is greater than a threshold and in response to the number of driver side door closing events occurring at the location being greater than a threshold, performing at least one of instructing the transportation provider to remind the transportation requestor to exit a transportation provider vehicle through a passenger side door, instructing the transportation provider to travel to a location at which the transportation requestor may exit the transportation provider vehicle through the passenger side door, instructing the transportation provider to query the transportation requestor as to which side of a street the transportation requestor prefers to exit the transportation provider vehicle, and instructing the transportation requestor as to which door of the transportation provider vehicle to exit.

In some examples, the operations may further include unlocking at least one door locking mechanism on a side of a transportation provider vehicle at the at least one of the pickup location and the drop-off location, wherein the side of the transportation provider vehicle that is unlocked is based at least in part on the database of door closing event locations.

In some examples, the operations may further include receiving a time stamp associated with an end transportation signal or a begin transportation signal from the transportation provider computing device, receiving a time stamp associated with a door closing event on a transportation provider vehicle, calculating a time difference between the time stamp associated with the end transportation signal or the begin transportation signal and the time stamp associated with the door closing event.

In some examples, the observed door closing events may be based on sensor data and the sensor data is received from at least one of an accelerometer, a gyroscope, a barometer, and a magnetometer within the transportation provider computing device.

In some examples, the operations may further include identifying popular pickup locations and drop-off locations based at least in part on the database of door closing event locations and providing a recommendation of at least one of the popular pickup locations and drop-off locations to the transportation provider device.

In some examples, the operations may further include assigning a convenience score to the transportation provider based on a level of convenience provided to the transportation requestor in performing the transportation task and matching the transportation provider to another transportation requestor in response to the convenience score exceeding a threshold.

In some examples, the operations may further include receiving feedback from the transportation requestor associated with a level of convenience of the at least one of the pickup location and the drop-off location and updating map data based on the feedback.

In some examples, the operations may further include identifying a discrepancy between at least one of a planned pickup location and an actual pickup location, and a planned drop-off location and an actual drop-off location.

In one example, a non-transitory computer-readable storage medium may include computer-readable instructions that, when executed by at least one processor of a computing device, cause the computing device to identify a transportation task within a dynamic transportation network, access a database of door closing event locations, wherein the database is populated from observed door closing events within the dynamic transportation network, determine location information specifying at least one of a pickup location and a drop-off location for the transportation task based at least in part on the database of door closing event locations, and provide the location information to a transportation provider computing device, wherein a transportation provider performs the transportation task that comprises at least one of picking up a transportation requestor at the pickup location and dropping off the transportation requestor at the drop-off location.

Figure 10:
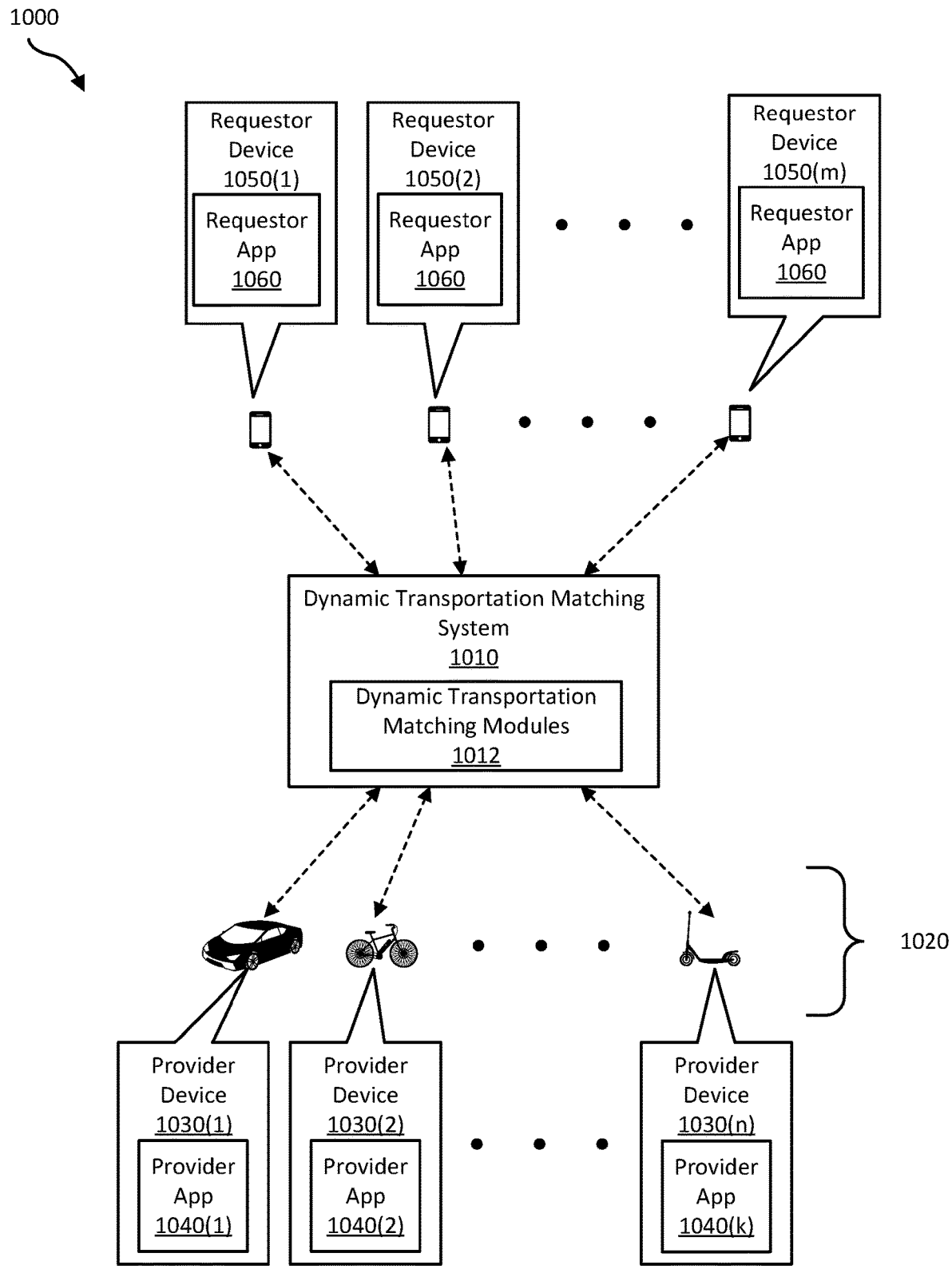
FIG. 10 illustrates an example system for matching transportation requests with a dynamic transportation network that includes personal mobility vehicles.

FIG. 10 illustrates an example system 1000 for matching transportation requests with a dynamic transportation network that includes personal mobility vehicles. As shown in FIG. 10, a dynamic transportation matching system 1010 may be configured with one or more dynamic transportation matching modules 1012 that may perform one or more of the steps described herein. Dynamic transportation matching system 1010 may represent any computing system and/or set of computing systems capable of matching transportation requests. Dynamic transportation matching system 1010 may be in communication with computing devices in each of a group of vehicles 1020. Vehicles 1020 may represent any vehicles that may fulfill transportation requests. In some examples, vehicles 1020 may include disparate vehicle types and/or models. For example, vehicles 1020 may include road-going vehicles and personal mobility vehicles. In some examples, some of vehicles 1020 may be standard commercially available vehicles. According to some examples, some of vehicles 1020 may be owned by separate individuals (e.g., transportation providers). Furthermore, while, in some examples, many or all of vehicles 1020 may be human-operated, in some examples many of vehicles 1020 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 10 does not specify the number of vehicles 1020, it may be readily appreciated that the systems described herein are applicable to hundreds of vehicles, thousands of vehicles, or more. In one example, dynamic transportation matchings system 1010 may coordinate transportation matchings within a single region for 50,000 vehicles or more on a given day. In some examples, vehicles 1020 may collectively form a dynamic transportation network that may provide transportation supply on an on-demand basis to transportation requestors.

As mentioned above, dynamic transportation matching system 1010 may communicate with computing devices in each of vehicles 1020. The computing devices may be any suitable type of computing device. In some examples, one or more of the computing devices may be integrated into the respective vehicles 1020. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 1010.

As shown in FIG. 10, vehicles 1020 may include provider devices 1030(1)-(n) (e.g., whether integrated into the vehicle, permanently affixed to the vehicle, temporarily affixed to the vehicle, worn by a driver of the vehicle, etc.). In some examples, provider devices 1030 may include a provider apps 1040(1)-(k). Provider apps 1040(1)-(k) may represent any application, program, and/or module that may provide one or more services related to operating a vehicle and/or providing transportation matching services. For example, provider apps 1040(1)-(k) may include a transportation matching application for providers and/or one or more applications for matching personal mobility vehicles (PMVs) with requestor devices. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider applications 1040(1)-(k) may match the user of provider apps 1040(1)-(k) (e.g., a transportation provider) with transportation requestors through communication with dynamic transportation matching system 1010. In addition, and as is described in greater detail below, provider apps 1040(1)-(k) may provide dynamic transportation management system 1010 with information about a provider (including, e.g., the current location of the provider and/or vehicle) to enable dynamic transportation management system 1010 to provide dynamic transportation matching and/or management services for the provider and one or more requestors. In some examples, provider apps 1040(1)-(k) may coordinate communications and/or a payment between a requestor and a provider. According to some embodiments, provider apps 1040(1)-(k) may provide a map service, a navigation service, a traffic notification service, and/or a geolocation service.

Additionally, as shown in FIG. 10, dynamic transportation matching system 1010 may communicate with requestor devices 1050(1)-(m). In some examples, requestor devices 1050 may include a requestor app 1060. Requestor app 1060 may represent any application, program, and/or module that may provide one or more services related to requesting transportation matching services. For example, requestor app 1060 may include a transportation matching application for requestors. In some examples, requestor app 1060 may match the user of requestor app 1060 (e.g., a transportation requestor) with transportation providers through communication with dynamic transportation matching system 1010. In addition, and as is described in greater detail below, requestor app 1060 may provide dynamic transportation management system 1010 with information about a requestor (including, e.g., the current location of the requestor) to enable dynamic transportation management system 1010 to provide dynamic transportation matching services for the requestor and one or more providers. In some examples, requestor app 1060 may coordinate communications and/or a payment between a requestor and a provider. According to some embodiments, requestor app 1060 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

Figure 11:
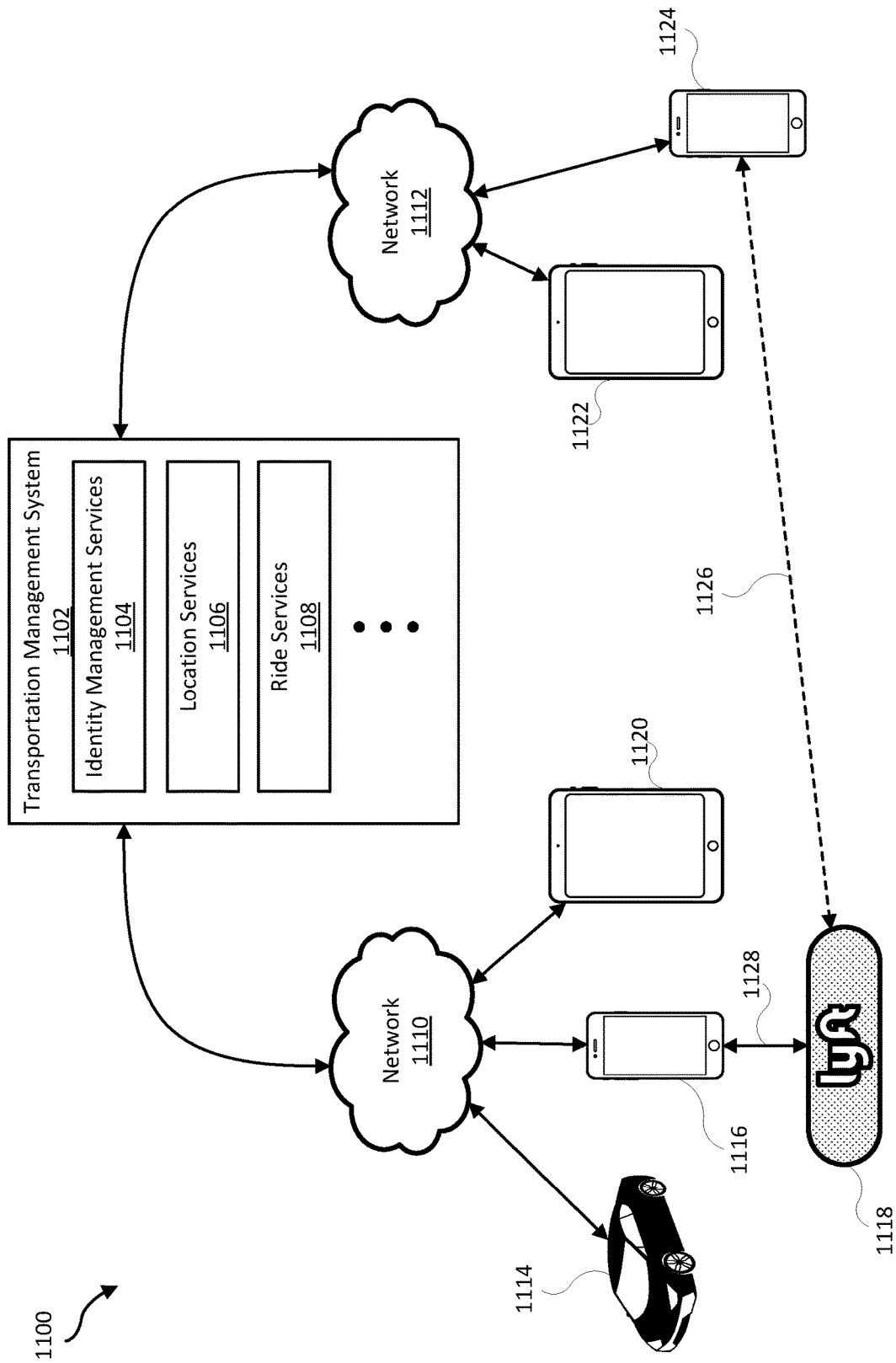
FIG. 11 is an illustration of an example transportation requestor/transportation provider management environment.

FIG. 11 shows a transportation management environment 1100, in accordance with various embodiments. As shown in FIG. 11, a transportation management system 1102 may run one or more services and/or software applications, including identity management services 1104, location services 1106, ride services 1108, and/or other services. Although FIG. 11 shows a certain number of services provided by transportation management system 1102, more or fewer services may be provided in various implementations. In addition, although FIG. 11 shows these services as being provided by transportation management system 1102, all or a portion of any of the services may be processed in a distributed fashion. For example, computations associated with a service task may be performed by a combination of transportation management system 1102 (including any number of servers, databases, etc.), one or more devices associated with a provider (e.g., devices integrated with managed vehicles 1114(a), 1114(b), and/or 1114(c); provider computing devices 1116 and tablets 1120; and transportation management vehicle devices 1118), and/or more or more devices associated with a ride requestor (e.g., the requestor's computing devices 1124 and tablets 1122). In some embodiments, transportation management system 1102 may include one or more general purpose computers, server computers, clustered computing systems, cloud-based computing systems, and/or any other computing systems or arrangements of computing systems. Transportation management system 1102 may be configured to run any or all of the services and/or software components described herein. In some embodiments, the transportation management system 1102 may include an appropriate operating system and/or various server applications, such as web servers capable of handling hypertext transport protocol (HTTP) requests, file transfer protocol (FTP) servers, database servers, etc.

In some embodiments, identity management services 1104 may be configured to perform authorization services for requestors and providers and/or manage their interactions and/or data with transportation management system 1102. This may include, e.g., authenticating the identity of providers and determining that they are authorized to provide services through transportation management system 1102. Similarly, requestors' identities may be authenticated to determine whether they are authorized to receive the requested services through transportation management system 1102. Identity management services 1104 may also manage and/or control access to provider and/or requestor data maintained by transportation management system 1102, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1102 may also manage and/or control access to provider and/or requestor data stored with and/or obtained from third-party systems. For example, a requester or provider may grant transportation management system 1102 access to a third-party email, calendar, or task management system (e.g., via the user's credentials). As another example, a requestor or provider may grant, through a mobile device (e.g., 1116, 1120, 1122, or 1124), a transportation application associated with transportation management system 1102 access to data provided by other applications installed on the mobile device. In some examples, such data may be processed on the client and/or uploaded to transportation management system 1102 for processing.

In some embodiments, transportation management system 1102 may provide ride services 1108, which may include ride matching and/or management services to connect a requestor to a provider. For example, after identity management services module 1104 has authenticated the identity a ride requestor, ride services module 1108 may attempt to match the requestor with one or more ride providers. In some embodiments, ride services module 1108 may identify an appropriate provider using location data obtained from location services module 1106. Ride services module 1108 may use the location data to identify providers who are geographically close to the requestor (e.g., within a certain threshold distance or travel time) and/or who are otherwise a good match with the requestor. Ride services module 1108 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1108 may use rule-based algorithms and/or machine-learning models for matching requestors and providers.

Transportation management system 1102 may communicatively connect to various devices through networks 1110 and/or 1112. Networks 1110 and 1112 may include any combination of interconnected networks configured to send and/or receive data communications using various communication protocols and transmission technologies. In some embodiments, networks 1110 and/or 1112 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1110 and/or 1112 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.12 family of standards, Bluetooth, Bluetooth Low Energy, Near Field Communication (NFC), Z-Wave, and ZigBee). In various embodiments, networks 1110 and/or 1112 may include any combination of networks described herein or any other type of network capable of facilitating communication across networks 1110 and/or 1112.

In some embodiments, transportation management vehicle device 1118 may include a provider communication device configured to communicate with users, such as drivers, passengers, pedestrians, and/or other users. In some embodiments, transportation management vehicle device 1118 may communicate directly with transportation management system 1102 or through another provider computing device, such as provider computing device 1116. In some embodiments, a requestor computing device (e.g., device 1124) may communicate via a connection 1126 directly with transportation management vehicle device 1118 via a communication channel and/or connection, such as a peer-to-peer connection, Bluetooth connection, NFC connection, ad hoc wireless network, and/or any other communication channel or connection. Although FIG. 11 shows particular devices communicating with transportation management system 1102 over networks 1110 and 1112, in various embodiments, transportation management system 1102 may expose an interface, such as an application programming interface (API) or service provider interface (SPI) to enable various third parties which may serve as an intermediary between end users and transportation management system 1102.

In some embodiments, devices within a vehicle may be interconnected. For example, any combination of the following may be communicatively connected: vehicle 1114, provider computing device 1116, provider tablet 1120, transportation management vehicle device 1118, requestor computing device 1124, requestor tablet 1122, and any other device (e.g., smart watch, smart tags, etc.). For example, transportation management vehicle device 1118 may be communicatively connected to provider computing device 1116 and/or requestor computing device 1124. Transportation management vehicle device 1118 may establish communicative connections, such as connections 1126 and 1128, to those devices via any suitable communication technology, including, e.g., WLAN technologies implementing the IEEE 802.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1102 using applications executing on their respective computing devices (e.g., 1116, 1118, 1120, and/or a computing device integrated within vehicle 1114), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1114 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1102. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 12:
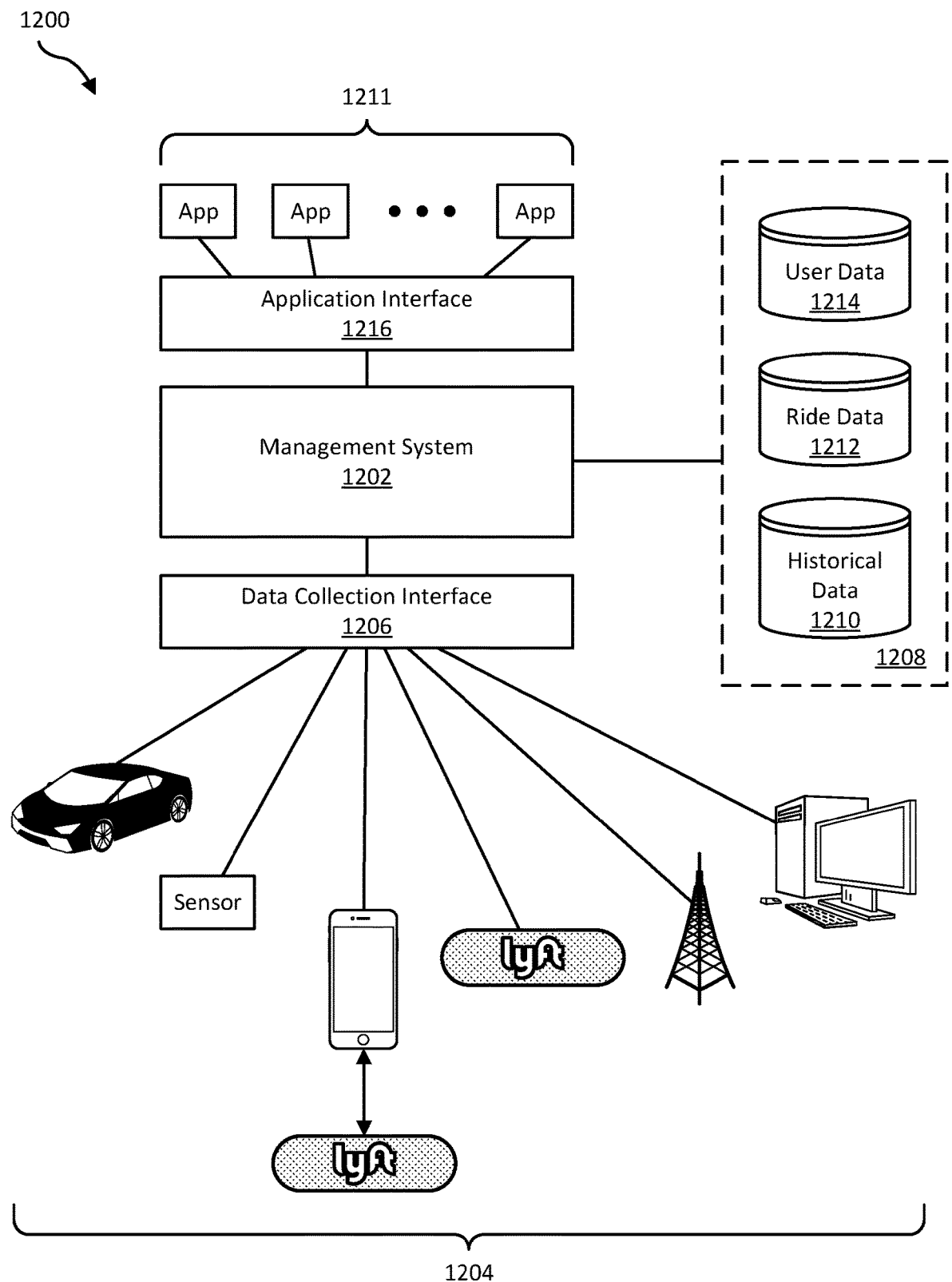
FIG. 12 is an illustration of an example data collection and application management system.

FIG. 12 shows a data collection and application management environment 1200, in accordance with various embodiments. As shown in FIG. 12, management system 1202 may be configured to collect data from various data collection devices 1204 through a data collection interface 1206. As discussed above, management system 1202 may include one or more computers and/or servers or any combination thereof. Data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, data collection interface 1206 may be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from data collection devices 1204 can be stored in data store 1208. Data store 1208 may include one or more data stores, such as databases, object storage systems and services, cloud-based storage services, and other data stores. For example, various data stores may be implemented on a non-transitory storage medium accessible to management system 1202, such as historical data store 1210, ride data store 1212, and user data store 1214. Data stores 1208 can be local to management system 1202, or remote and accessible over a network, such as those networks discussed above or a storage-area network or other networked storage system. In various embodiments, historical data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data. Although certain data stores are shown by way of example, any data collected and/or stored according to the various embodiments described herein may be stored in data stores 1208.

As shown in FIG. 12, an application interface 1216 can be provided by management system 1202 to enable various apps 1218 to access data and/or services available through management system 1202. Apps 1218 may run on various user devices (including provider and requestor computing devices, such as those discussed above) and/or may include cloud-based or other distributed apps configured to run across various devices (e.g., computers, servers, or combinations thereof). Apps 1218 may include, e.g., aggregation and/or reporting apps which may utilize data 1208 to provide various services (e.g., third-party ride request and management apps). In various embodiments, application interface 1216 can include an API and/or SPI enabling third party development of apps 1218. In some embodiments, application interface 1216 may include a web interface, enabling web-based access to data 1208 and/or services provided by management system 1202. In various embodiments, apps 1218 may run on devices configured to communicate with application interface 1216 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    accessing one or more door usage events in a database of stored door usage events, wherein the database is populated with observed door opening or door closing events within vehicles that are part of a dynamic transportation network;
    determining location information specifying at least one of a pickup location and a drop-off location for a transportation task associated with a transportation requestor;
    generating, based on the determined location information and the accessed door usage events, a recommendation of which door is to be suggested for entry into or exit from a vehicle used for the transportation task; and
    presenting the generated recommendation to the transportation requestor, indicating which door is suggested for entry into or exit from the vehicle.

2. The computer-implemented method of claim 1, wherein the generated recommendation is presented within a transportation application running on a mobile device associated with the transportation requestor.

3. The computer-implemented method of claim 1, wherein the generated recommendation is presented on a display within the vehicle used for the transportation task.

4. The computer-implemented method of claim 1, wherein the location information for the pickup location or drop-off location indicates a potential hazard on at least one side of the vehicle.

5. The computer-implemented method of claim 1, further comprising controlling a locking mechanism on one or more doors of the vehicle based on the generated recommendation.

6. The computer-implemented method of claim 5, wherein controlling a locking mechanism on one or more doors of the vehicle based on the generated recommendation includes unlocking a suggested entry door or exit door of the vehicle.

7. The computer-implemented method of claim 5, wherein controlling a locking mechanism on one or more doors of the vehicle based on the generated recommendation includes locking one or more vehicle doors that were not recommended for entry into or exit from the vehicle.

8. The computer-implemented method of claim 1, further comprising instructing a transportation provider associated with the vehicle to remind the transportation requestor to enter into or exit from the vehicle through the suggested door.

9. The computer-implemented method of claim 1, further comprising instructing a transportation provider associated with the vehicle to drive to a different location that is more suitable for pickup and/or drop-off according to the door usage events.

10. The computer-implemented method of claim 1, wherein determining location information further includes identifying a route to the pickup location or to the drop-off location that is based on the accessed door closing event locations.

11. The computer-implemented method of claim 10, further comprising:
providing the location information to a transportation provider computing device, wherein a transportation provider performs the transportation task that comprises at least one of:
picking up the transportation requestor at the pickup location according to the determined route, or
dropping off the transportation requestor at the drop-off location according to the determined route.

12. A system comprising one or more physical processors and one or more memories coupled to one or more of the physical processors, the one or more memories comprising instructions operable when executed by the one or more physical processors to cause the system to perform operations comprising:
accessing one or more door usage events in a database of stored door usage events, wherein the database is populated with observed door opening or door closing events within vehicles that are part of a dynamic transportation network;
determining location information specifying at least one of a pickup location and a drop-off location for a transportation task associated with a transportation requestor;
generating, based on the determined location information and the accessed door usage events, a recommendation of which door is to be suggested for entry into or exit from a vehicle used for the transportation task; and
presenting the generated recommendation to the transportation requestor, indicating which door is suggested for entry into or exit from the vehicle.

13. The system of claim 12, wherein the generated recommendation is presented within a transportation application running on a mobile device associated with the transportation requestor.

14. The system of claim 12, wherein the generated recommendation is presented on a display within the vehicle.

15. The system of claim 12, wherein the location information for the pickup location or drop-off location indicates a potential hazard on at least one side of the vehicle.

16. The system of claim 12, further comprising controlling a locking mechanism on one or more doors of the vehicle based on the generated recommendation.

17. The system of claim 16, wherein controlling a locking mechanism on one or more doors of the vehicle based on the generated recommendation includes unlocking a suggested entry or exit door of the vehicle.

18. The system of claim 16, wherein controlling a locking mechanism on one or more doors of the vehicle based on the generated recommendation includes locking one or more vehicle doors that were not recommended for entry into or exit from the vehicle.

19. The system of claim 12, further comprising instructing a transportation provider associated with the vehicle to remind the transportation requestor to enter into or exit from the vehicle through the suggested door.

20. A non-transitory computer-readable storage medium comprising computer-readable instructions that, when executed by at least one processor of a computing device, cause the computing device to:
access one or more door usage events in a database of stored door usage events, wherein the database is populated with observed door opening or door closing events within vehicles that are part of a dynamic transportation network;
determine location information specifying at least one of a pickup location and a drop-off location for a transportation task associated with a transportation requestor;
generate, based on the determined location information and the accessed door usage events, a recommendation of which door is to be suggested for entry into or exit from a vehicle used for the transportation task; and
present the generated recommendation to the transportation requestor, indicating which door is suggested for entry into or exit from the vehicle.

* * * * *